United States Patent
Mummery

(10) Patent No.: US 11,828,261 B2
(45) Date of Patent: Nov. 28, 2023

(54) AXIAL FLOW TURBINE APPARATUS

(71) Applicant: FLEX MARINE POWER LTD, Glasgow (GB)

(72) Inventor: David Paul Mummery, Glasgow (GB)

(73) Assignee: FLEX MARINE POWER LTD, Glasgow (GB)

( * ) Notice: Subject to any disclaimer, the term of this patent is extended or adjusted under 35 U.S.C. 154(b) by 148 days.

(21) Appl. No.: 17/604,059

(22) PCT Filed: Apr. 16, 2020

(86) PCT No.: PCT/GB2020/050962
§ 371 (c)(1),
(2) Date: Oct. 15, 2021

(87) PCT Pub. No.: WO2020/212702
PCT Pub. Date: Oct. 22, 2020

(65) Prior Publication Data
US 2022/0154683 A1 May 19, 2022

(30) Foreign Application Priority Data
Apr. 18, 2019 (GB) .................................. 1905569

(51) Int. Cl.
*F03B 3/12* (2006.01)
*F03B 11/00* (2006.01)

(52) U.S. Cl.
CPC .............. *F03B 3/126* (2013.01); *F03B 11/00* (2013.01)

(58) Field of Classification Search
None
See application file for complete search history.

(56) References Cited

U.S. PATENT DOCUMENTS 4,026,587 A * 5/1977 Hultman ............... F03B 17/061
415/201
6,104,097 A * 8/2000 Lehoczky ............... F03B 13/00
290/43

(Continued)

FOREIGN PATENT DOCUMENTS

CN 104314743 A 1/2015
GB 2459843 A * 11/2009 ............ F03B 13/264

(Continued)

OTHER PUBLICATIONS

European Patent Office, International Search Report for International Application No. PCT/GB2020/050962, dated Jul. 22, 2020, 4 pages.

(Continued)

*Primary Examiner* — Shafiq Mian
(74) *Attorney, Agent, or Firm* — PERKINS IP LAW GROUP LLC; Jefferson Perkins

(57) ABSTRACT

A turbine apparatus (10) for deployment in a waterway, comprises a rotor support system (12), a rotor mechanism (14) and a power take-off device (16). The rotor support system (12) is operable to support and align the rotor mechanism (14) with a direction of flow of flowing water in the waterway. Deployment of the turbine apparatus (10) in flowing water generates power. The rotor support system (12) includes an elongated shaft (13), which includes a buoyancy adjusting component (17); a flexible coupling (15) at a first end; and the rotor mechanism (14) being attachable to a second free end of the elongated shaft (13). The flexible coupling (15) facilitates connection of the first end of the elongated shaft to a support structure and facilitates a substantially freely yawing connection of the axial flow turbine apparatus to a support structure located in the waterway in which the turbine apparatus is deployed. The flexible coupling (15) also controls pitching motion of the (Continued)

turbine apparatus (10) relative to the support structure; and in use, permits a predetermined range of yawing motion of the turbine apparatus relative to the support structure; and responds to changes in flow of the flowing water, to maintain the turbine apparatus (10) with a compliant attitude, thereby maintaining alignment of the axis of the elongated shaft and the rotor mechanism with the direction of flow. The buoyancy adjusting component (17) being operable to maintain the deployed turbine apparatus with substantially neutral buoyancy relative to the waterway in which the turbine apparatus is deployed.

27 Claims, 15 Drawing Sheets

(56) References Cited

U.S. PATENT DOCUMENTS 7,105,942 B2 * 9/2006 Henriksen ............... B63B 35/44
  415/60

2010/0038911 A1 * 2/2010 Vigars ................... F03B 17/061
  290/53
2016/0256232 A1 * 9/2016 Awtar .................... A61B 34/77

FOREIGN PATENT DOCUMENTS

| GB | 2459843 A | 11/2009 |
| WO | 2013079831 A1 | 6/2013 |
| WO | 2014017914 A1 | 1/2014 |
| WO | 2015090414 A1 | 6/2015 |

OTHER PUBLICATIONS

European Patent Office, Written Opinion of the International Searching Authority for International Application No. PCT/GB2020/050962, dated Jul. 22, 2020, 6 pages.

United Kingdom Intellectual Property Office, Combined Search and Examination Report under Sections 17 and 18(3) for Application No. GB1905569.8, dated May 10, 2019, 5 pages.

\* cited by examiner

AXIAL FLOW TURBINE APPARATUS

FIELD OF THE INVENTION

This invention relates to a turbine apparatus for producing power from fluid flow, for example water flow. Particularly, the invention relates to an axial flow turbine apparatus comprising a rotor mechanism and a rotor support system, which is operable to support and control the position and alignment of the rotor mechanism relative to the direction of flowing water in a waterway, for example a river, estuary, channel, pipe, sea, ocean etc.

BACKGROUND TO THE INVENTION

Fluid-driven turbines have been known for many years. Despite this, there remains a need for turbines, particularly, water turbines, which can be installed in a simple manner and at low cost, for example to provide electrical power to small communities.

In most, water-based applications there is a reliance on relatively massive civil and structural engineering works. It will be appreciated that such an application, often requires the use of specialist plant, and produces a high capital cost per unit of output.

There is a need for a novel approach, which uses significantly less material mass and simpler plant. Specifically, where it is desired to produce power from naturally occurring sources, for example in river flow, tidal streams or marine currents, it is desirable for an apparatus to be robust, simply transportable and simply positioned. In such an application it would be desirable for a turbine to be deployable and maintainable from relatively small vessels.

SUMMARY OF THE INVENTION

An axial flow turbine apparatus for deployment in a waterway, the turbine apparatus comprising a rotor support system, a rotor mechanism and a power take-off device, wherein the rotor support system is operable to support and control position and alignment of the rotor mechanism relative to a direction of flow of flowing water in the waterway, wherein deployment of the turbine apparatus in flowing water generates power, wherein the rotor support system includes;
an elongated shaft, which includes:
  a buoyancy adjusting component;
  a flexible coupling at a first end; and
  the rotor mechanism being attachable to a second free end of the elongated shaft;
wherein the flexible coupling:
  facilitates connection of the first end of the elongated shaft to a support structure located in the waterway in which the turbine apparatus is deployed, and facilitates a substantially freely yawing connection of the axial flow turbine apparatus to the support structure located in the waterway in which the turbine apparatus is deployed;
  controls pitching and yawing motion of the elongated shaft and the rotor mechanism relative to the rotor support system and support structure respectively; and
  in use, responds to changes in flow of the flowing water, to maintain the turbine apparatus with a compliant attitude, thereby maintaining alignment of the axis of the elongated shaft and the rotor mechanism with the direction of flow; and wherein the buoyancy adjusting component is operable to maintain the deployed turbine apparatus with substantially neutral buoyancy relative to the waterway in which the turbine apparatus is deployed.

Compliant attitude means the elongated shaft is substantially free (compliant) to pivot in a manner which allows axial alignment of the shaft relative to the direction of flow (attitude). This ensures the axial flow turbine apparatus i.e. the assembly of the rotor mechanism and the rotor support system is aligned such that the orientation of the rotor mechanism is optimised for operation. If off-axis or imbalanced forces are encountered by the rotor mechanism such as due to turbulence, wave induced currents, or collision, then this compliant arrangement allows a momentary responsive change in attitude of the turbine apparatus to take place, shedding peak forces and so helping to protect the structure from damage.

It will be appreciated that reference to an axial flow turbine apparatus relates to an arrangement/assembly of components that convert the kinetic energy of moving water, wave motion or currents into electrical energy, useful work or other forms of energy, such as hydraulic power, mechanical power, heating, cooling, carbon sequestration, water desalination, ocean cleansing etc. The system utilises a power take-off (PTO) device, which, for example, is connected to the elongated shaft, the flexible coupling or as a hub of the rotor mechanism.

Neutral buoyancy is the condition in which the average density of an item is equal to the density of the fluid in which it is immersed. For this application the neutral buoyancy condition is hence defined such that when the rotor support system is attached to its support structure there is approximately a zero-moment acting about the flexible coupling due to the combined forces of weight, and buoyancy acting on the freely articulating rotor support system, particularly, the attached rotor mechanism will not rise or fall when immersed in the water at turbine operating depth.

It will be appreciated that a rotor mechanism may be heavy and therefore may be liable to sink (negative buoyancy), but the rotor support system is configured to provide neutral buoyancy to a turbine apparatus including a rotor mechanism, wherein the position of the rotor mechanism in a body of water is stable and does not rise or fall, and the position of the rotor mechanism in the body of water is controlled by adjusting buoyancy, for example via a buoyancy adjusting component, which may be provided as part of the elongated shaft or to function relative to the elongated shaft.

The flexible coupling may comprise a pivotal pitch connector and a pivotal yaw connector, wherein the pivotal pitch connector permits pitching motion of the assembly of the elongated shaft and the rotor mechanism relative to the rotor support system and the waterway in which the turbine apparatus is deployed. The yaw control connector may facilitate connection of the axial flow turbine apparatus to a support structure in a waterway and controls the degree of yawing motion of the axial flow turbine apparatus when deployed.

The turbine apparatus may further comprise extremity bump-stops, which facilitate the extent of pitching motion. Alternatively, the flexible coupling may comprise a section of flexible material connected to the first end of the elongated shaft, wherein the flexible material is of given stiffness or spring constant, and is operable to maintain the assembly of the elongated shaft and the rotor mechanism in a compliant attitude and to transmit axial torque.

The pivotal pitch connector may comprise a universal joint connecting the elongated shaft to a pivotal yaw connector. The universal joint may be a cardan joint, for example a single cardan type joint or a double cardan type joint.

Alternatively, the pivotal pitch connector may comprise a connector facilitating single degree of freedom movement of the assembly of the elongated shaft and the rotor mechanism. Examples of a connector facilitating single degree of freedom movement may comprise a chain link joint, a hook joint, a clevis joint etc.

The pivotal pitch connector permits pitching movement of the assembly of the elongated shaft and rotor mechanism relative to a plane of flow when deployed in flowing water and whilst the flexible coupling facilitates connection of the first end of the elongated shaft to a support structure.

The flexible coupling may further comprise a resilient member operable in a biasing manner to maintain the assembly of the elongated shaft and the rotor mechanism in a compliant attitude relative to the support structure, toward a central or straight position, by permitting responsive movement of the assembly of the elongated shaft and the rotor mechanism and to limit the extent of pitching motion of the assembly of the elongated shaft and the rotor mechanism. The resilient member may be a spring associated with the pivotal pitch connector. The resilient member may be a helical spring which is mounted around the pivotal pitch connector such that the range of movement of the assembly of the elongated shaft and the rotor mechanism is substantially unhindered in water flow, but in the event of a change of flow direction or in still water the spring is operable to bias the assembly of the elongated shaft and the rotor mechanism to a predetermined neutral position relative to an axis of the pivotal yaw connector.

Another example of a suitable resilient member may, for example, be formed by an arrangement of two hydraulic rams configured to position the pivotal pitch connector, or to act as dampers to absorb energy from dynamic pitching or thrust loads or displacements exerted on the pivotal pitch connector during operation.

Where the flexible coupling is a universal-type joint, the resilient member maintains alignment of the pivotal yaw connector with the elongated shaft as the elongated shaft naturally aligns with direction of flow. Maintaining alignment, thus ensuring, that the flexible coupling yaws relative to the support structure, where the pivotal yaw connector allows the elongated shaft to yaw around the support structure in changing flow, for example changing tide. As such, any possibility of jack-knife of the flexible coupling is avoided.

The flexible coupling facilitates free movement of the rotor mechanism to align with the flow path of the body of water in which the turbine apparatus is immersed. It will be appreciated this means that the turbine apparatus is configured such that the rotor mechanism can freely follow the direction of flow, for example tidal flow, without obstruction, due to the system being substantially neutral buoyant and due to the flexible coupling providing little or no obstruction to movement to direct the rotor mechanism in the direction of flow.

The first end of the elongated shaft may be located at a predetermined height from the bed of a body of water/waterway, for example sea, ocean, river, estuary, harbour, channel, pipe etc. in which the system is deployed. The system may be pivotally connected to a suitable support structure or system and may be arranged such that the rotor mechanism can freely orientate through 360 degrees in one plane, such that the rotor mechanism freely follows and aligns axially with the direction of flow of water in the body of water/waterway in which the system is deployed.

In use, a turbine apparatus comprising a rotor support system which includes an assembly of a flexible coupling, an elongated shaft, a rotor mechanism and a power take-off is such that the flexible coupling and the elongated shaft transmit torque due to rotation of the rotor mechanism and the power take-off facilitates the conversion of the motive/kinetic energy to electrical energy or other forms of energy, e.g. hydraulic, mechanical etc. In an example, the flexible coupling and the elongated shaft may be arranged to rotate in response to rotation of the rotor mechanism.

The pivotal yaw connector may comprise a mounting spike receivable in a hollow support structure. Alternatively, the pivotal yaw connector may comprise a hollow member or channel into which can be received a tether such as chain, rope or cable providing a support structure.

The pivotal yawing connector may be provided by a torque bar axially aligned to and mounted to a support structure comprising a tensioned tether member, wherein the torque bar is connected to the tether member and facilitates yawing motion and controls the extent of yawing motion of the turbine apparatus relative to the tether member. The tether member may comprise a rope, cable, chain etc.

The torque bar may comprise a T-shape arrangement, wherein the pivotal yaw connector is formed by the head of the T and the pivotal pitch connector is provided by the body of the T. The T-shape ensures the axis of yaw and the axis of pitching are offset from each other by a predetermined distance to enhance stability and functional range of the turbine apparatus when deployed.

The axial flow turbine apparatus may further comprise a buoyancy adjusting component, wherein the buoyancy adjusting component is movable relative to the elongated shaft to adjust buoyancy distribution of the assembly of the elongated shaft and the rotor mechanism such that the position of the rotor mechanism relative to the body of water is neutrally buoyant or buoyantly stable.

The buoyancy adjusting component may comprise a mass connected to and movable relative to the elongated shaft. The buoyancy adjusting component may comprise a mass connected to an external surface of the elongated shaft, the internal surface of the elongated shaft or both the internal and external surface of the elongated shaft, wherein the mass is movable along the elongated shaft to affect buoyancy distribution of the assembly of the elongated shaft and the rotor mechanism.

The orientation of the rotor mechanism and the elongated shaft may be adjusted by moving the position of the buoyancy adjusting component along the length of the elongated shaft.

A buoyancy adjusting component comprising an external mass may be provided by a sleeve comprising a hollow tubular member, wherein the elongated shaft is receivable within the hollow of the hollow tubular member and wherein the sleeve can slide along the external surface of the elongated shaft.

The buoyancy adjusting component may include an inner tube within an outer tube, wherein the elongated shaft is received inside the inner tube and an annular space is defined between the inner tube and the outer tube.

The annular space may be filled with buoyant material. The buoyant material may be foam. Alternatively, or in addition, the buoyant material may be gas, for example air, nitrogen etc. Alternatively, the annular space may be substantially occupied by a plurality of elements, for example donuts, cylinders etc., which are made of buoyant material, wherein the donuts, cylinders, etc. are distributed along the length of the annular space.

Voids defined inside the elongated shaft may be filled with buoyant material, for example foam or gas. The function of the buoyancy adjusting component is to assist the assembly comprising the elongated shaft and the rotor mechanism to attain neutral buoyancy, whilst the system is deployed for operation to convert energy of the moving water to useful energy/work.

It will be appreciated, being able to adjust buoyancy of the system is also beneficial for maintenance, repair and moving location of the axial flow turbine apparatus, wherein the position of the buoyancy adjusting component can be changed relative to the elongated shaft to allow the rotor mechanism of a deployed system to be positively buoyant i.e. rise in the water/pitch to the surface such that the rotor mechanism can be accessed relatively easily from a boat or the like at the surface of the waterway in which the system is deployed.

Advantageously, the rotor mechanism may be removable from the end of the elongated shaft to allow the rotor mechanism to be transported, for example towed to a suitable location for maintenance, replacement etc.

Advantageously, when the rotor mechanism or a replacement rotor mechanism is ready to be deployed again, it can be attached to the end of the elongated shaft, in situ, and the influence of the buoyancy adjusting component is such that when reassembled the combined rotor assembly and elongated shaft can be redeployed to the operating depth and neutral buoyancy can once again be established.

Similarly, if the axial flow turbine apparatus, is detachable from its support structure the benefit of a buoyancy adjusting component is such that the complete apparatus can be made positively buoyant, which means the complete apparatus can be retrieved to the surface of the body of water and can be transported, for example towed relatively easily by a boat or the like, for example for maintenance or to be located to a different location.

The buoyancy adjusting component may comprise a shaft-based buoyancy aid, which is located within the elongated shaft and provides a movable mass connected to an internal surface of the elongated shaft.

The shaft-based buoyancy aid may include a movable mass located inside a sealed gas-filled buoyant tube, wherein the gas-filled buoyant tube is sealed at both ends.

The shaft-based buoyancy aid may include a wheeled housing operable to transport the movable mass along the length of the tube when buoyancy is to be adjusted.

The shaft-based buoyancy aid may further comprise an electronic controller operable to actively balance the assembly of the elongated shaft and the rotor mechanism relative to water flow, wherein the electronic controller is operable to measure pitch angle of one or more of the elongated shaft and the rotor mechanism and to effect and control movement of the mass such that the elongated shaft and the rotor mechanism are aligned with a predetermined, programmed, position.

The shaft-based buoyancy aid may include a toothed rack extending along the length the tube and a servo driven toothed gear, wherein meshing of teeth on the toothed rack with teeth on the servo-driven gear facilitates movement of the mass along the length of the tube to adjust buoyancy of the assembly of the elongated shaft and the rotor mechanism.

Alternatively, the shaft-based buoyancy aid may comprise a translation screw movable mass located within the elongated shaft, wherein the movable mass is operable to move relative to the translation screw to adjust buoyancy of the assembly of the elongated shaft and the rotor mechanism.

Alternatively, the shaft-based buoyancy aid may incorporate a belt drive or piston actuator to position the movable mass within the elongated shaft.

A controller, for example a micro controller may be operable to control the position of the buoyancy adjusting component along the elongated shaft.

The internal mass may comprise a servo-controlled sliding mass within a sealed buoyant tube to achieve adjustment of the floating orientation and to establish substantially neutral buoyancy behaviour.

The sealed buoyant tube may be filled with gas.

As described above, in respect of the buoyancy adjusting component, the position of the external mass, the internal mass or both the external mass and the internal mass of the shaft-based buoyancy aid may be adjusted relative to the elongated shaft when the axial flow turbine apparatus is in location such that a positive buoyancy condition can be achieved. When positively buoyant, at least the second end of the axial flow turbine apparatus will float towards the surface of water in which the apparatus is deployed. This facilitates inspection handling, maintenance, removal and/or towing of the rotor mechanism or axial flow turbine apparatus from the water surface.

The flexible coupling may comprise a section of flexible material connected to the first end of the elongated shaft, wherein the flexible material is of given stiffness or spring constant, and is operable to maintain the assembly of the elongated shaft and the rotor mechanism in a compliant attitude and to transmit axial torque.

The axial flow turbine apparatus may comprise a series of assemblies of the rotor support system, the rotor mechanism and at least one power take-off device, wherein the elongated shafts of each assembly are arranged end to end, wherein a rotor mechanism is located between elongated shafts and at the second end of the last elongated shaft in the series. Alternatively, the axial flow turbine apparatus may comprise a series of assemblies of the rotor support system, the rotor mechanism and the power take-off device arranged in a side by side arrangement, wherein the elongated shafts of each assembly are arranged in-parallel.

The power take-off device may be connected proximate the first end of the elongated shaft. Alternatively, the power take-off device may be connected proximate the second end of the elongated shaft. The power take-off may be formed as part of a hub of the rotor mechanism.

The rotor mechanism may comprise a plurality of radially projecting rotor arms and a ring encircling ends of the rotor arms, wherein the ring is operable to enhance hydrodynamic stability of the turbine apparatus when deployed in flowing water.

BRIEF DESCRIPTION OF THE DRAWINGS

Examples of the invention will now be described, by way of example, with reference to the drawings, in which.

DESCRIPTION

Figure 1:
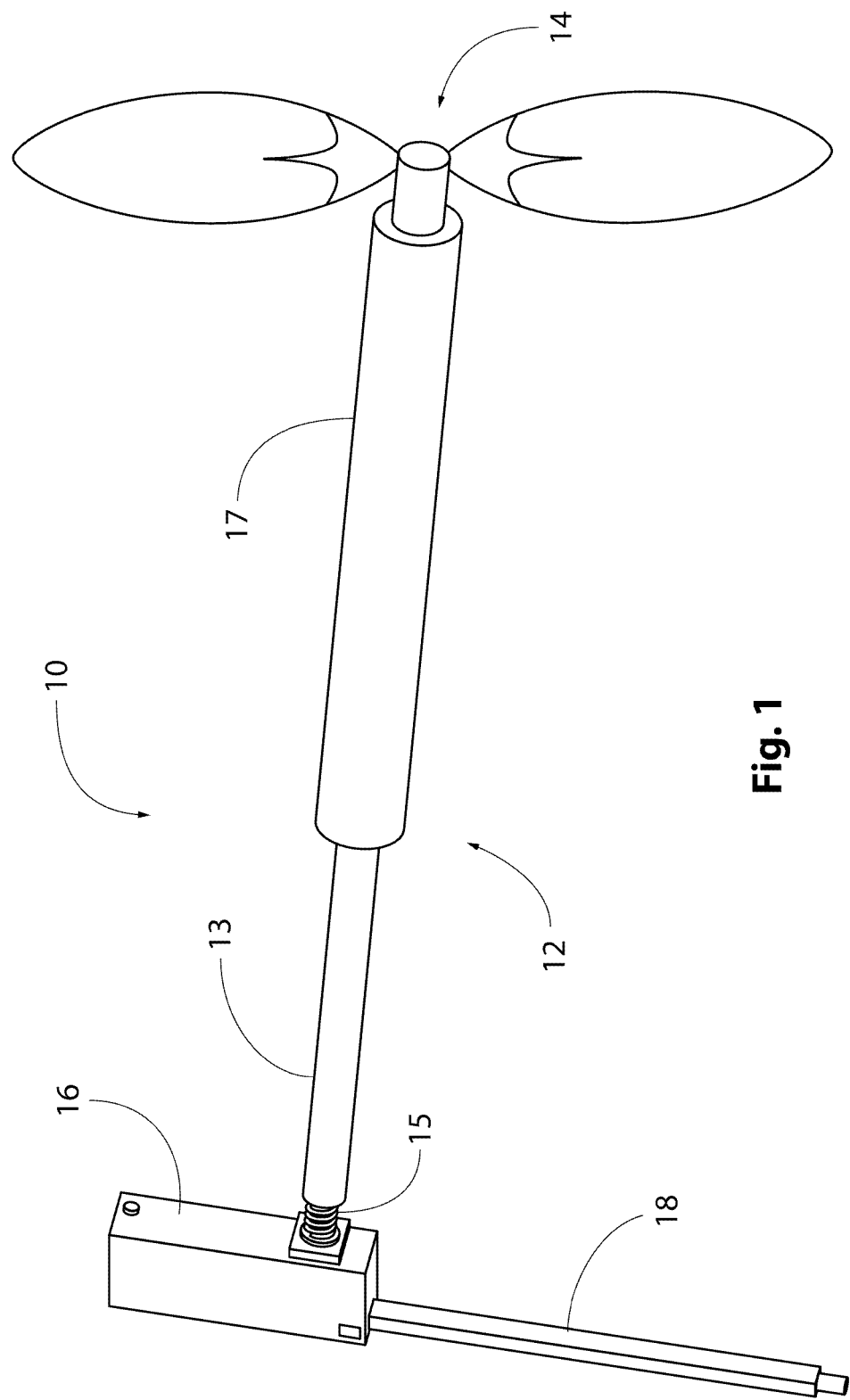
FIG. 1 is a perspective view of a turbine apparatus showing an example of a rotor support system according to an example of the present invention.
Figure 2:
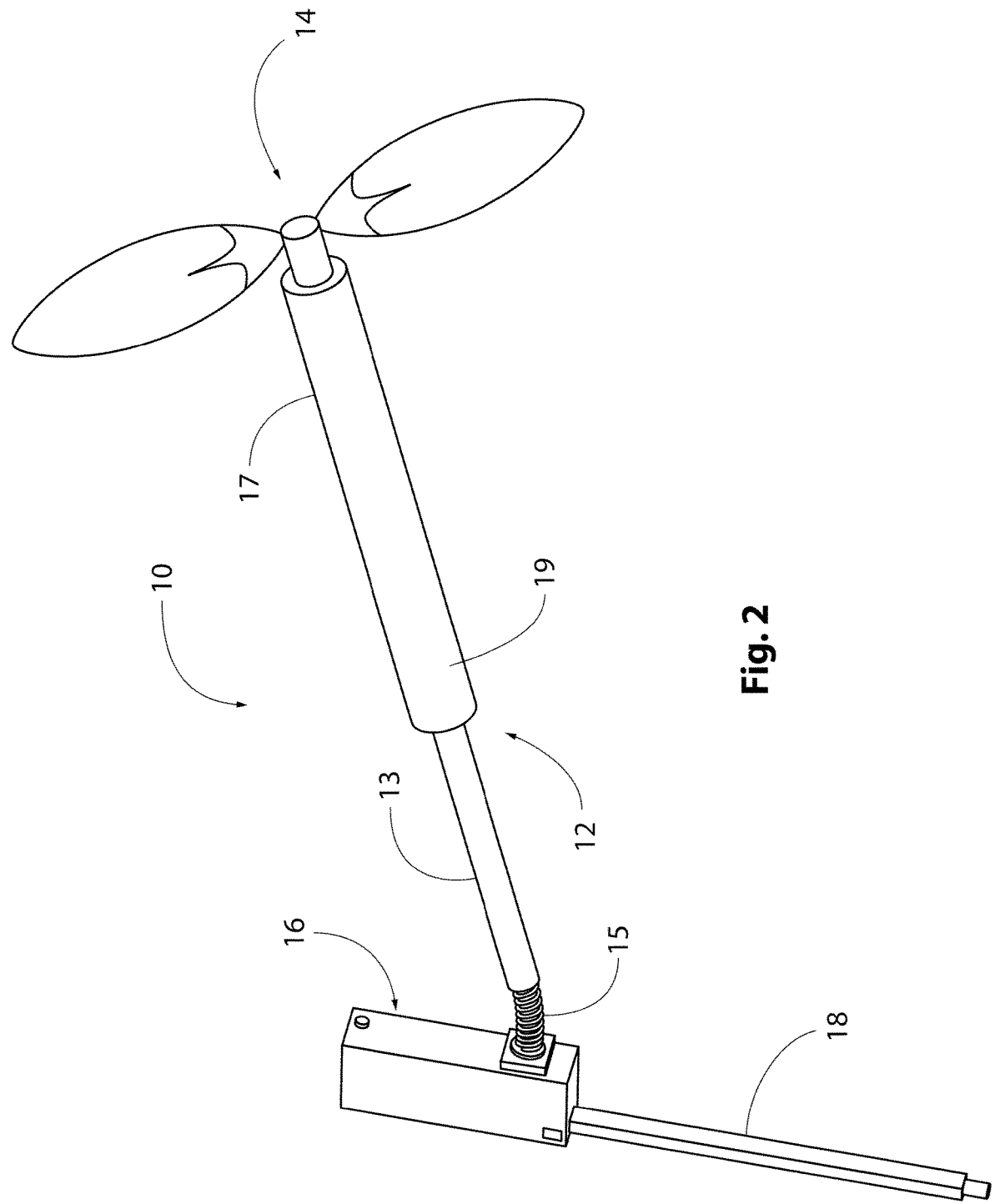
FIG. 2 is a perspective view of the turbine apparatus of FIG. 1 illustrating the effect of positive buoyancy.
Figure 3:
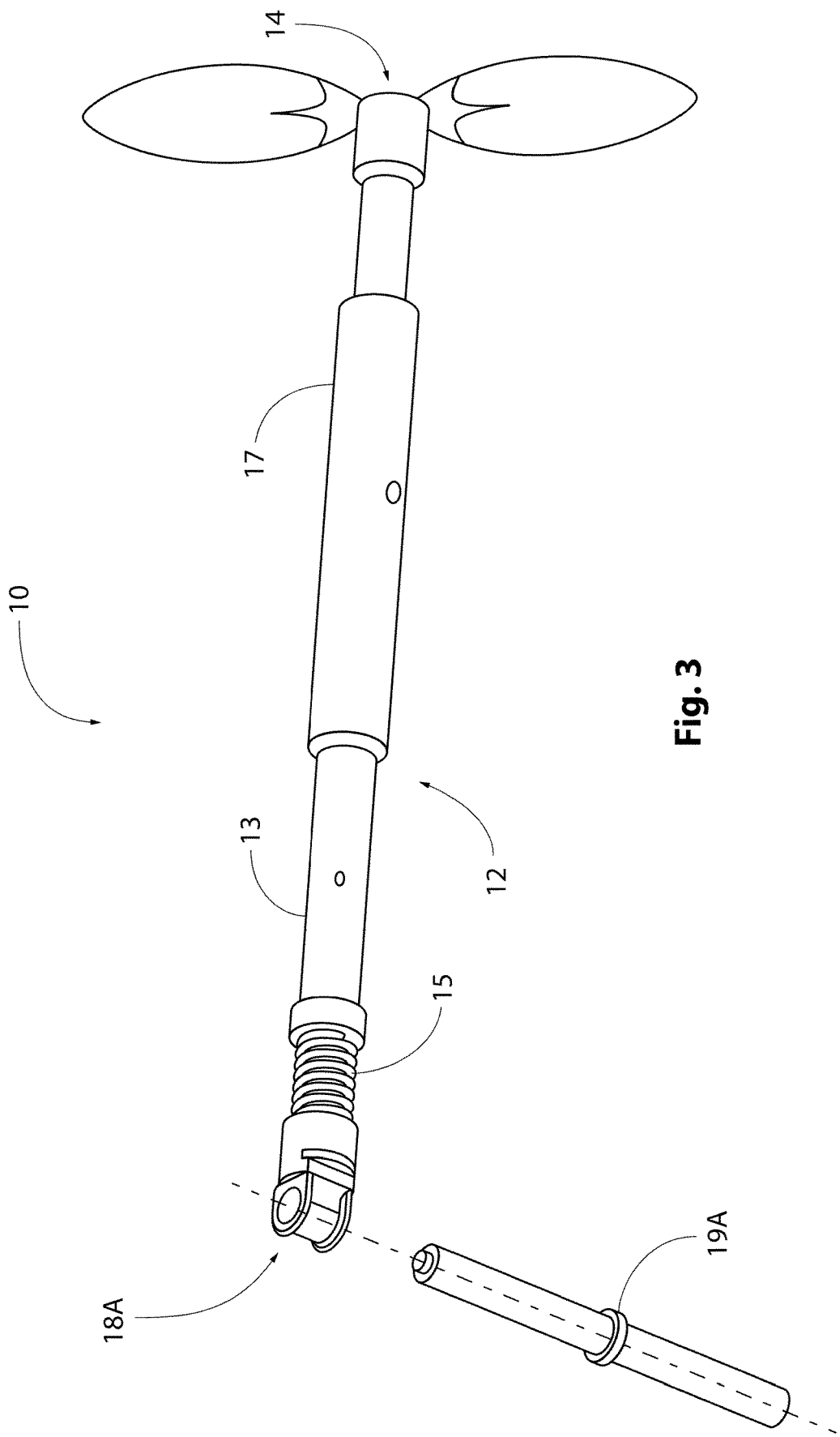
FIG. 3 is a perspective view of a turbine apparatus showing an example of a pivotal yaw connector, where the illustrated pivotal yaw connector is detached from a cylindrical rod of a support structure.

Referring to FIGS. 1, 2 and 3, an axial flow turbine apparatus 10 is illustrated, wherein the turbine apparatus 10 includes a turbine rotor support system 12, a rotor mechanism 14, a power take-off mechanism 16 and means 18 for connecting the turbine rotor support system 12 to a support structure (not illustrated).

FIGS. 1 and 2 show a mounting spike 18 as a means of attaching the turbine apparatus 10 to a hollow support structure (not shown).

FIG. 3 shows an alternative mounting arrangement in the form of mounting cylinder 18A, which includes a hole 18B, which can be received on a cylindrical post 19A as part of a support structure (not shown). The mounting cylinder 18A is received over the circular post 19A and is preferably latched into position whilst allowing free yawing motion of the assembly of the rotor support system 12 and the rotor mechanism 14.

Both the mounting spike 18 and the mounting cylinder 18A facilitate rotational movement, or yawing motion, of the turbine apparatus 10 relative to the axis of support structure and in response to flow direction when the turbine apparatus 10 is deployed and supported in flowing water. In both arrangements, attachment of the mounting spike 18 or the mounting cylinder 18A completes power export connection due to connectors being built into the arrangement for activation upon assembly.

The mounting arrangement provided by the spike 18 and the mounting cylinder 18A each facilitate transmittal of turbine-torque and thrust loads, free yawing, housing power connections and include a latch/release mechanism to prevent the turbine apparatus 10 being disconnected from the support structure during deployment of the turbine apparatus 10 in a body of water.

Figure 10:
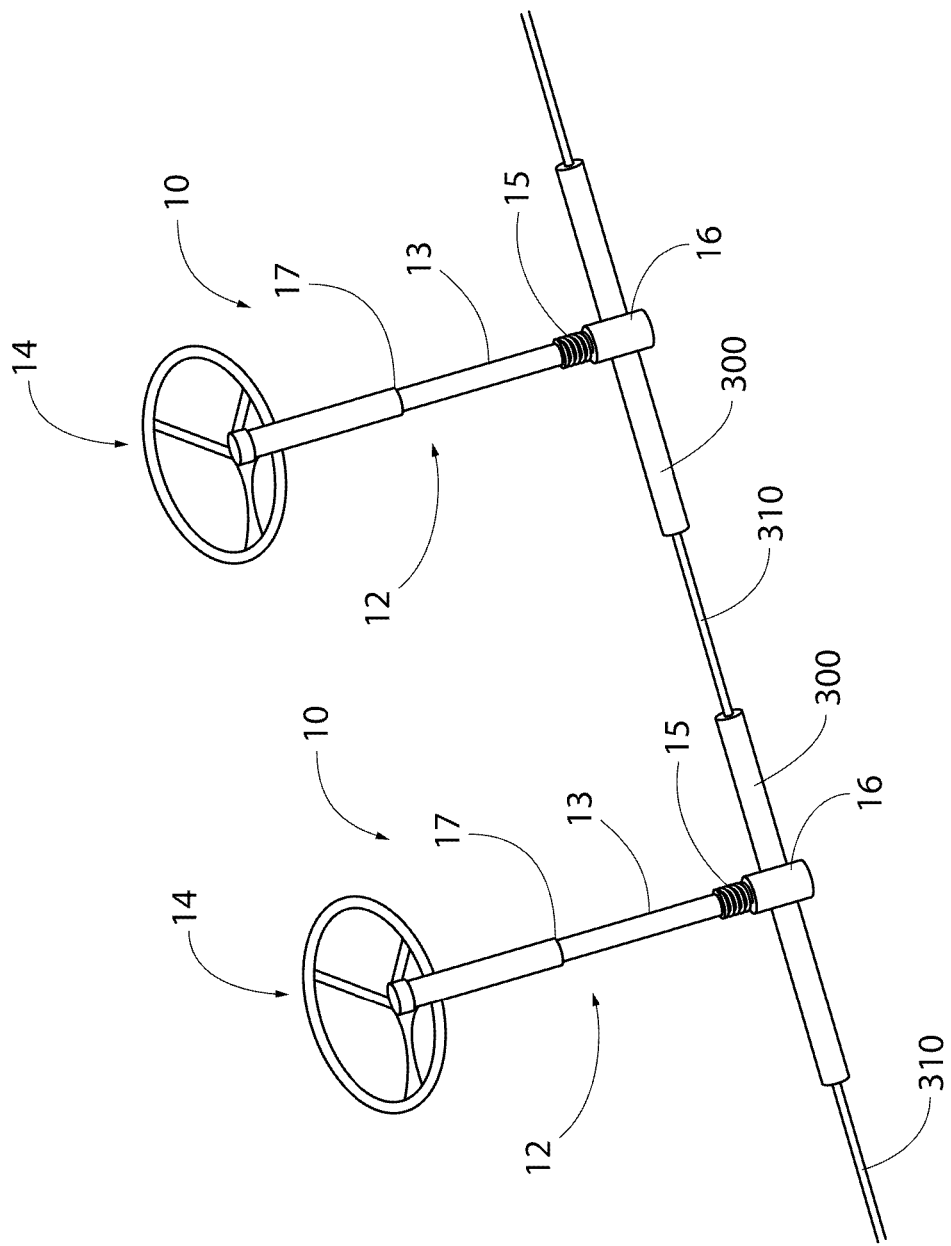
FIG. 10 illustrates a tensioned line as an example of a support structure, wherein two turbine apparatus are suspended in an in-parallel formation from a tensioned line.
Figure 11:
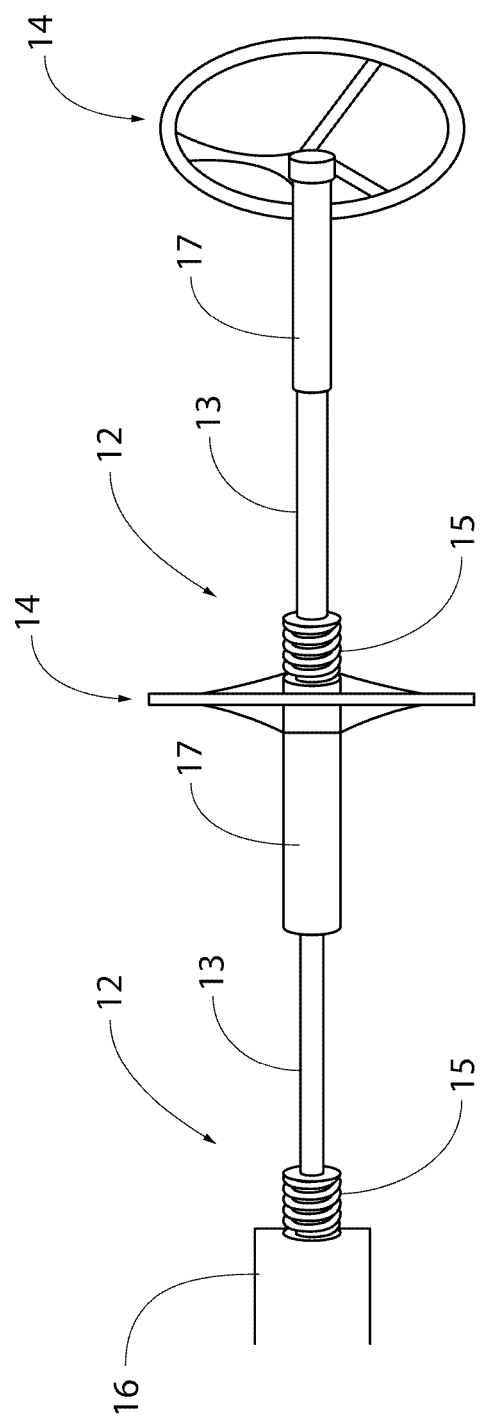
FIG. 11 illustrates an example of two turbine apparatus arranged in series.

FIGS. 1 to 3, 12, 13 and 15 show an example of a two-bladed rotor mechanism 14. FIGS. 10 and 11 (discussed further below) include a three-bladed rotor mechanism 14. Accordingly, it will be appreciated the configuration of the rotor mechanism 14 is included for illustrative purposes only.

In the illustrated example, the turbine rotor support system 12 includes an elongated shaft member 13, a flexible coupling 15 and a buoyancy adjusting component 17.

Figure 4:
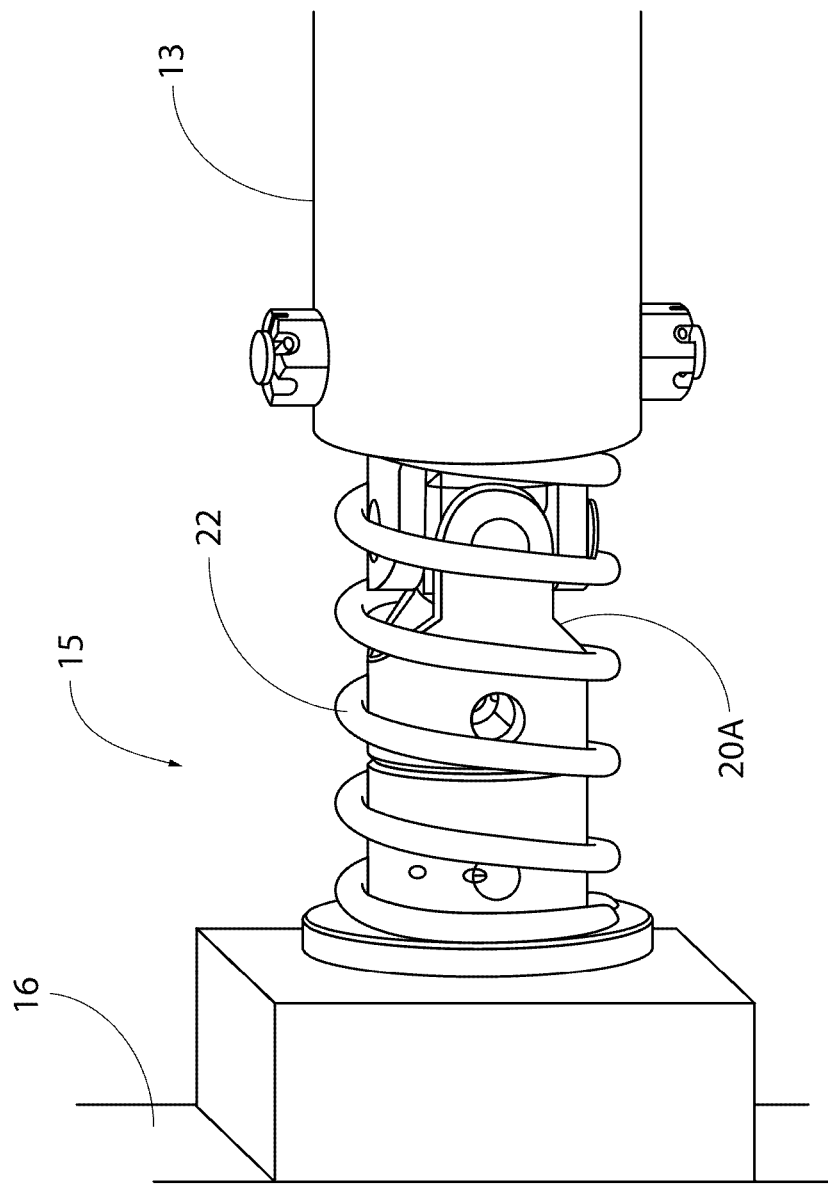
FIG. 4 illustrates a single cardan joint as an example of a universal joint, which forms part of the flexible coupling attaching the rotor support system to a support structure.
Figure 5:
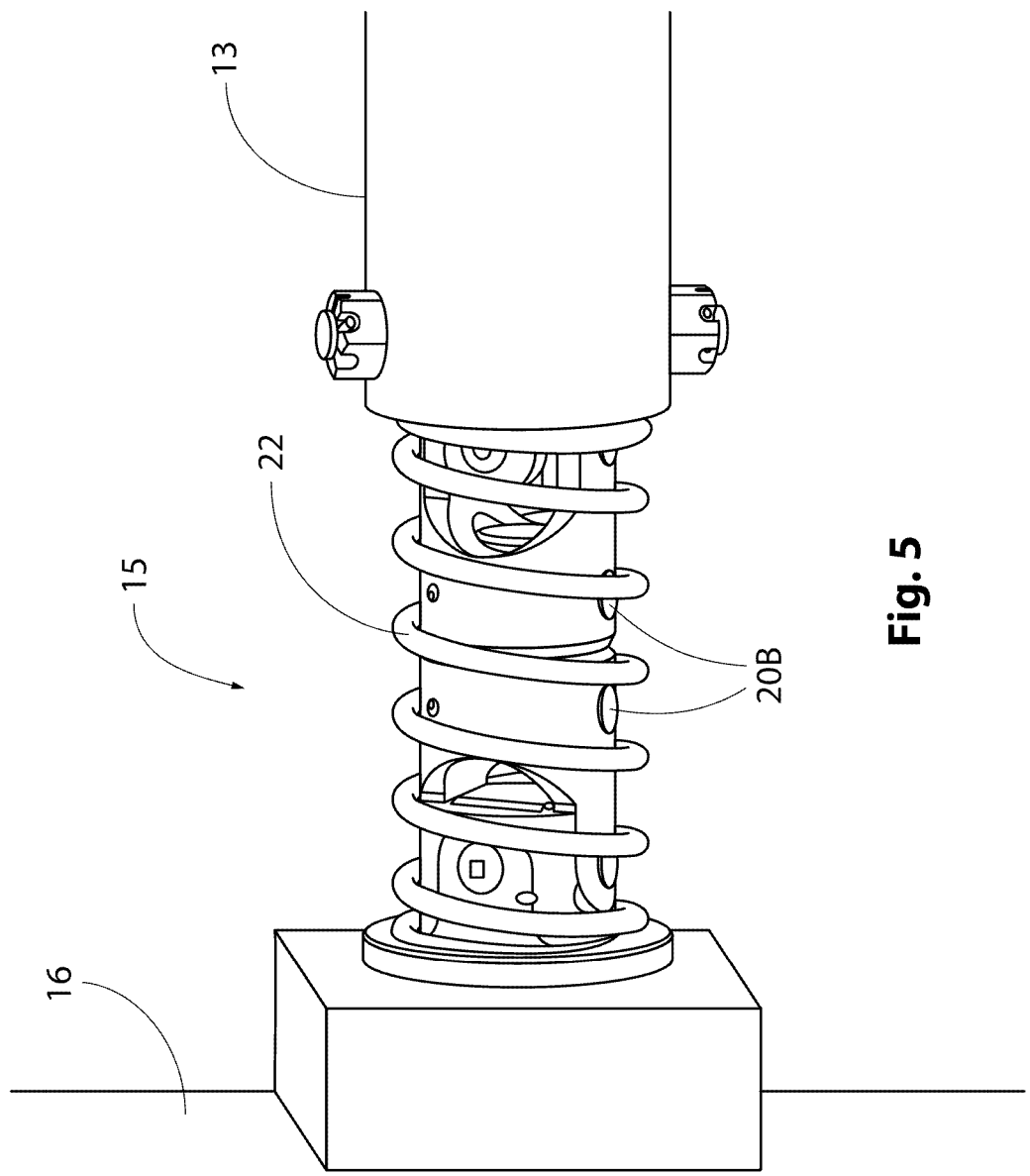
FIG. 5 illustrates a double cardan joint as an example of a universal joint, which forms part of the flexible coupling attaching the rotor support system to a support structure.
Figure 6A:
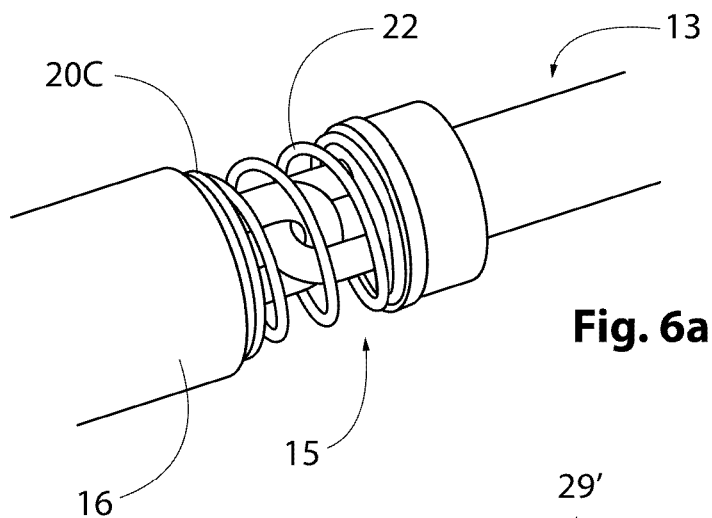
FIG. 6a illustrates an example of a chain link joint, which forms part of the flexible coupling attaching the rotor support system to a support structure.

In the illustrated examples, see FIGS. 4, 5, 6a and 6b, the flexible coupling 15 includes a connecting element 20A, 20B, 20C, 20D and a biasing element 22 (see FIGS. 4, 5 and 6a).

In the illustrated examples shown in FIGS. 4, 5, 6a and 6b, the connecting element 20A, 20B, 20C, 20D connects the elongated shaft 13 to the power take-off mechanism 16. The location of the power take-off 16 is for illustrative purposes and, as discussed further below, may be located at another point along the elongated shaft 13 or at the hub (see FIGS. 12, 13 and 15) of the rotor mechanism 14.

FIGS. 4, 5, 6a and 6b illustrate examples of a flexible coupling 15. The flexible coupling 15 includes a pivotal connecting member 20A, 20B, 20C, 20D and a spring 22 (no spring is included in the joint illustrated in FIG. 6b).

In FIGS. 4 and 5, the connecting member 20A, 20B is provided by a universal joint in the form of a single cardan-type joint 20A (FIG. 4) and a double cardan joint 20B (FIG. 5).

In each of the examples illustrated in FIGS. 4, 5, and 6a, a helical coil spring provides the biasing element 22, where the helical coil spring is located around the connecting element 20A, 20B, 20C.

When the axial flow turbine apparatus 10 utilises a universal joint, as illustrated in FIGS. 4 and 5, a power take-off is mounted adjacent the support structure (not illustrated) or adjacent to the component that facilitates connection of the axial flow turbine apparatus 10 to the support structure (not illustrated).

When using an axial flow turbine apparatus with a clevis joint the power take-off can be mounted anywhere on the elongated shaft, near or on the hub of the rotor mechanism.

In FIG. 6a the connecting member is provided by a chain link arrangement 20C.

Figure 6B:
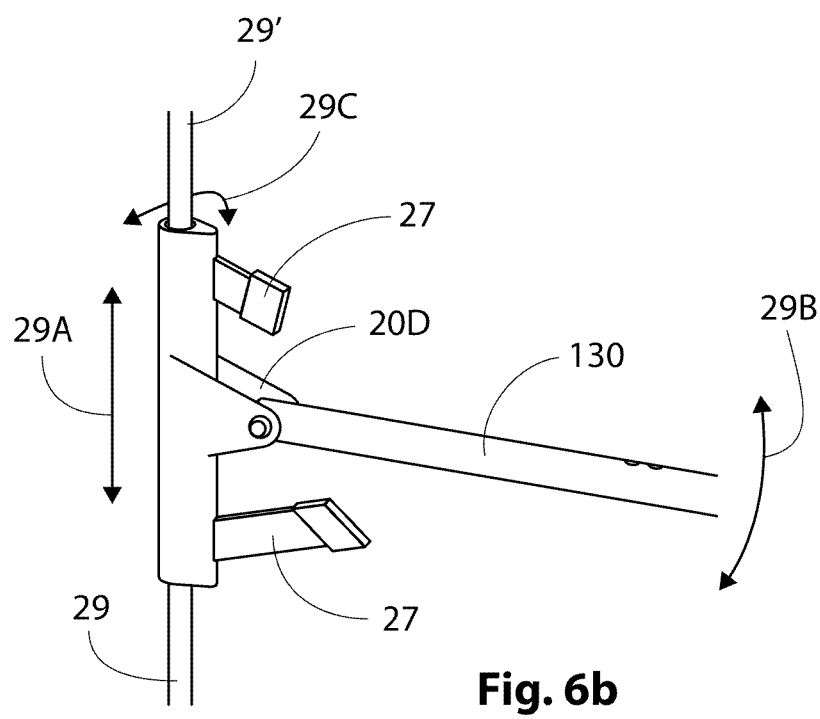
FIG. 6b illustrates an example of a clevis joint, which forms part of the flexible coupling attaching the rotor support system to a support structure.

In FIG. 6b the connecting member is provided by a clevis joint arrangement 20D.

A hook and eye arrangement (not illustrated) provides another example of a suitable pivotal connecting member.

Referring further to FIG. 6b, the clevis joint 20D allows a single degree of freedom pitching movement of the elongated shaft 13 relative to the support structure. It will be appreciated that full freedom of movement is achieved when the axis of movement of the clevis joint is set at ninety degrees to the yaw axis of the pivotal yaw connector 29. The pivotal yaw connector 29 facilitates connection of the support system to the support structure 29'. In the illustrated example, the support structure is a vertical tether, which inserts into the pivotal yaw connector 29. The height/vertical location is adjustable as indicated by arrows 29A. Pitch motion is in the direction of arrows 29B, where the extent of pitching motion is limited by the bump-stops 27. Yawing motion is rotational relative to the axis of the tether 29' and is indicated by arrow 29C.

In the illustrated example, the flexible coupling 15 facilitates and controls pitching movement of the assembly of the elongated shaft 13 and the rotor mechanism 14 relative to the support structure (indicated by 19A in FIG. 3) to which the turbine apparatus 10 is attached.

Figure 6C:
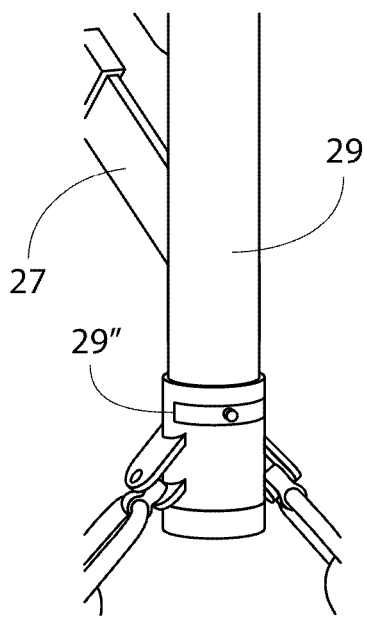
FIG. 6c illustrates an example of a pivotal yaw connector.

In the illustrated examples, a pivotal yaw connector facilitates connection of the turbine apparatus 10 to a support structure (not illustrated). Examples of suitable pivotal yaw connectors are: a mounting spike/rod (see FIGS. 1 and 2), a cylinder mount (see FIG. 3) or torque bar (see FIGS. 10, 12, 13*a*, 13*b*). An alternative example of a pivotal yaw connector is illustrated in FIG. 6*c*, where an integrated yaw limiting device 29" is used to resist yaw beyond a predetermined range such that umbilicals (not illustrated) can be protected.

When the turbine apparatus 10 is connected to a support structure the pivotal yaw connector, facilitates yawing motion of the turbine apparatus 10 relative to the axis of the support structure such that the orientation of the rotor mechanism 14 is adjusted by, and is aligned with, the direction of the flowing water in which the turbine apparatus 10 is deployed.

It will be appreciated that, the combination of the flexible coupling 15 (pivotal pitch connector) and the pivotal yaw connector (mounting spike/rod 18, or cylinder mount 18A or torque bar 300) facilitate multiple degree of freedom movement of the rotor mechanism 14 relative to the direction of flow of water in which the turbine apparatus 10 is deployed.

In the illustrated example, the position of the turbine apparatus 10, particularly, the rotor mechanism 14, relative to water flow is controlled by the flexible coupling 15 and the pivotal yaw connection to the support structure.

In each of the examples illustrated, the turbine apparatus 10 is connected at one end to a fixed support structure and is free to move at a second end; at the second free end the rotor mechanism 14 is attached to the elongated shaft 13.

The connector members 20A, 20B, 20C, 20D each allow pitching movement of the rotor support system 12 and the rotor mechanism 14, relative to the plane of flow. The extent of the pitching movement and the position adopted by the turbine apparatus 10 in the flowing water is controlled by the spring 22. Alternatively, or in addition the extent of pitching motion is controlled by a bump-stop 27 (see FIGS. 6*b*, 12 and 13). The bump-stop 27 may be rigid, but more preferably will include a degree of resilience to prevent over pitching of the turbine apparatus 10, but whilst allowing a degree of compliance in unsettled conditions in the waterway in which the turbine apparatus 10 is deployed.

The spring 22 and/or bump-stop 27 is/are particularly useful in low flow conditions and facilitates centring and levelling the rotor mechanism 14 relative to the flexible coupling 15 to avoid a jack-knife situation, which could potentially damage the flexible coupling 15 or could result in damage of the rotor mechanism 14, for example due to a collision between the rotor mechanism 14 and the support structure (not illustrated). It will be appreciated, if a jack-knife situation occurred it is highly likely that manual intervention would be required to re-orientate the turbine apparatus 10 when increased water flow rates are experienced. It will be appreciated that the location of deployment of such a turbine apparatus 10 may not lend itself to manual intervention.

In the example illustrated in FIG. 6*b* two bump-stops 27 extend from the elongated element of a pivotal yaw connector/torque bar 29. One bump-stop 27 is located above the clevis-type joint 20D and one bump-stop is located below the clevis-type joint 20D. The bump-stops 27 are positioned such that the pivotal extent of the pitching movement of the turbine apparatus (not visible) is restricted within predetermined limits. The bump-stops 27 may include a degree of resilience or damping such that they are responsive to changing conditions and therefore any risk of damage to the turbine apparatus (not visible) if the elongated shaft collides with the bump-stop 27 is minimised. The bump-stops 27 may include springs or elastic damping to minimise damage in sudden change of conditions in the water.

In the illustrated examples, the spring 22 is arranged such that the axis of the elongated shaft 13 and the rotational axis of the rotor mechanism 14 is biased to being aligned/centred relative to the direction of flow of the flowing water and the power take-off mechanism 16. In the illustrated example the power take-off 16 is located towards the first end i.e. the supported end of the elongated shaft 13.

The configuration of the flexible coupling 15, namely the pivotal pitch connector and the resilient member/spring 22 provide freedom and flexibility of movement of the assembly of the elongated shaft 13 and the rotor mechanism 14; this freedom and flexibility of movement ensures that the turbine apparatus 10 aligns and operates efficiently to capture energy via the interaction of the rotor mechanism 14 with the flowing water (as the primary source of energy) and to the transmission of the captured energy by the power take-off mechanism 16 to generate exportable power, for example electricity.

This efficient transmission and generation of power is optimised due to the responsiveness of the turbine apparatus 10 to changing flow directions. This responsiveness of the turbine apparatus 10 to the changing flow direction is provided by the combination of a substantially neutrally buoyant system (as discussed further below), the elongated shaft pivotal yaw connector 18, 18A, which is allows yawing motion of the apparatus relative to flow direction and the flexible coupling 15, which maintains the turbine apparatus 10 with a compliant attitude relative to the support structure and the plane of flow.

The resilient member 22 protects the pivotal pitch connector 20A, 20B, 20C, 20D and facilitates responsive pitching movement of the flexible coupling 15 due to the movement of the water in which the turbine apparatus 10 is deployed. The flexibility and compliance within this arrangement serves to protect structural components from certain modes of environmental loading, resulting in overall lower extreme loads experienced by the key structural components. Such load shedding allows components to be made lighter, smaller and less costly.

The neutrally buoyant system comprises an assembly of the rotor mechanism 14 and the rotor support system 12. As referenced above, neutrally buoyant (neutral buoyancy) means the average density of the assembly of the rotor mechanism 14 and the rotor support system 12 is substantially equal to the density of the water in which the turbine apparatus 10 is immersed. For this application the neutral buoyancy condition is hence defined such that when the rotor support system is attached to its support structure there is approximately a zero-moment acting about the flexible coupling due to the combined forces of weight, and buoyancy acting on the freely articulating rotor support system 12, particularly, the attached rotor mechanism 14 will not rise or fall when immersed in the water at the operating depth.

Put in another way, neutral buoyancy can be expressed as: within a reasonable tolerance the freely articulating part of the turbine apparatus 10, i.e. the rotor mechanism 14 and the elongated shaft 13 has a tendency neither to move upward or downward due to buoyancy or gravitational forces when left undisturbed, and when the system is attached and freely pivoting about the support structure (see FIGS. 3, 6b, 10, 11, 12 and 13 as examples of support structure).

In the examples illustrated in FIGS. 1, 2, 3 and 7, neutral buoyancy of the turbine apparatus 10 can be established by adjusting the position of the buoyancy adjusting component 17 relative to the elongated shaft 13.

In the illustrated example, the buoyancy adjusting component 17 comprises a filled hollow sleeve which is placed over the external surface of the elongated shaft 13. It will be appreciated that the length of the buoyancy adjusting component 17 is shorter than the length of the elongated shaft 13 such that the position of the buoyancy adjusting component 17 can be moved relative to the length of the elongated shaft 13 such that the balance and resulting attitude of the turbine apparatus 10 can be adjusted i.e. adjusting load distribution affects the location of the centre of buoyancy of the turbine apparatus 10. By changing the location of the buoyancy adjusting component 17 relative to the length of the elongated shaft 13 the orientation of the rotational axis of the rotor mechanism 14 and the rotor support system 12 is adjustable such that they can be positioned substantially horizontally within the body of water. This orientation of the rotor support system 12 and the rotor mechanism 14 aligns the rotating plane of the rotor mechanism 14 substantially vertically.

In the illustrated example, the buoyancy adjusting component 17 is located external to the elongated shaft 13. The buoyancy adjusting component 17 is locked in position after each adjustment.

Figure 7:
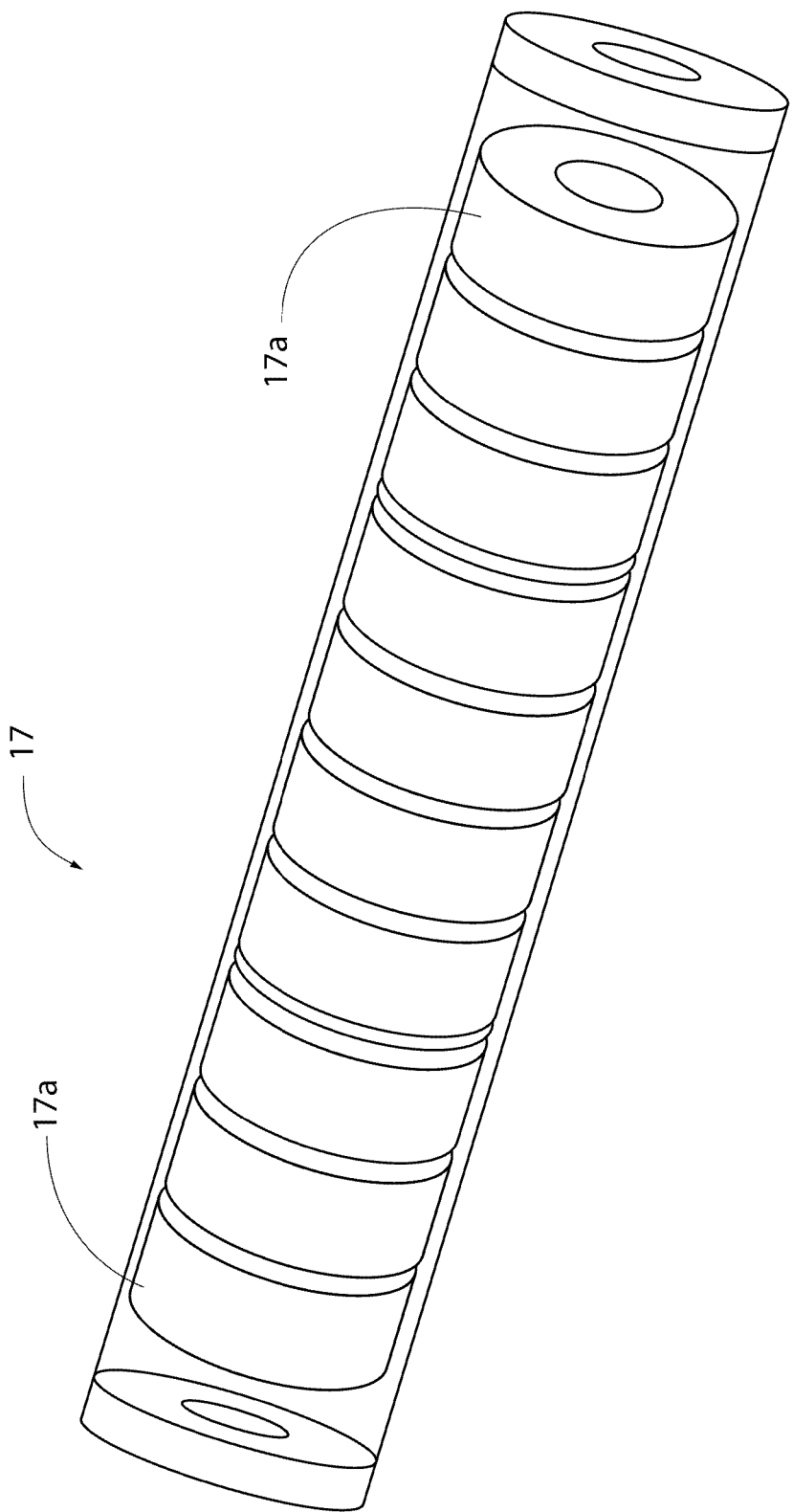
FIG. 7 illustrates a perspective view of an example of an external buoyancy adjusting component.

An example of a buoyancy adjusting component 17 is a tubular assembly, which includes an inner tube within an outer tube. The arrangement of the inner tube within an outer tube defines an annular space between the inner tube and the outer tube. In one example the annular space may be filled with buoyant material, for example foam or gas. In another example, as illustrated in FIG. 7, the annular space is occupied by a plurality of buoyant donuts 17a, which are distributed along the length of the tube providing the buoyancy adjusting component 17.

As discussed above, a function of the buoyancy adjusting component 17 is to provide a neutrally buoyant system. However, it will be appreciated that being able to adjust buoyancy of the system is also beneficial for maintenance because the position of the buoyancy adjusting component 17 can be changed relative to the elongated shaft 13 to allow the rotor mechanism 14 to rise in the water (positive buoyancy) (see FIGS. 2, 13a and 13b) and therefore the rotor mechanism 14 can be accessed relatively easily from a vessel floating on the surface of the body of water/waterway whilst the turbine apparatus 10 remains in the deployed location. In this position the rotor mechanism 14 and potentially the power take-off 16 can be easily accessed and, if required removed for floated tow to a servicing location.

It will be appreciated that by simply changing the location of the external buoyancy adjusting component 17 relative to the elongated shaft 13, the turbine apparatus 10 can be made positively buoyant and would require very little downtime for repair or routine maintenance.

From this positively buoyant configuration a vessel operator can either detach the rotor mechanism 14 (as described above) or detach the entire turbine apparatus 10 from the support structure (not illustrated) to allow the entire assembly of rotor mechanism 14, rotor support system 12 and the power take-off 16 to then float on the surface of the body of water. This would allow the turbine apparatus 10 to be towed by a boat or suitable vessel to an alternative deployment location or to a land based location, for example a harbour, for more involved servicing or repairs on land or whilst floated in a harbour area.

The cylindrical mount 18A or torque bar 300 (FIGS. 3 and 10) may include a bearing assembly, which is positively buoyant, such that when the turbine apparatus 10 is disconnected from the support structure positive buoyancy of the bearing assembly will allow this end of the turbine apparatus 10 to float upwards.

Figure 8:
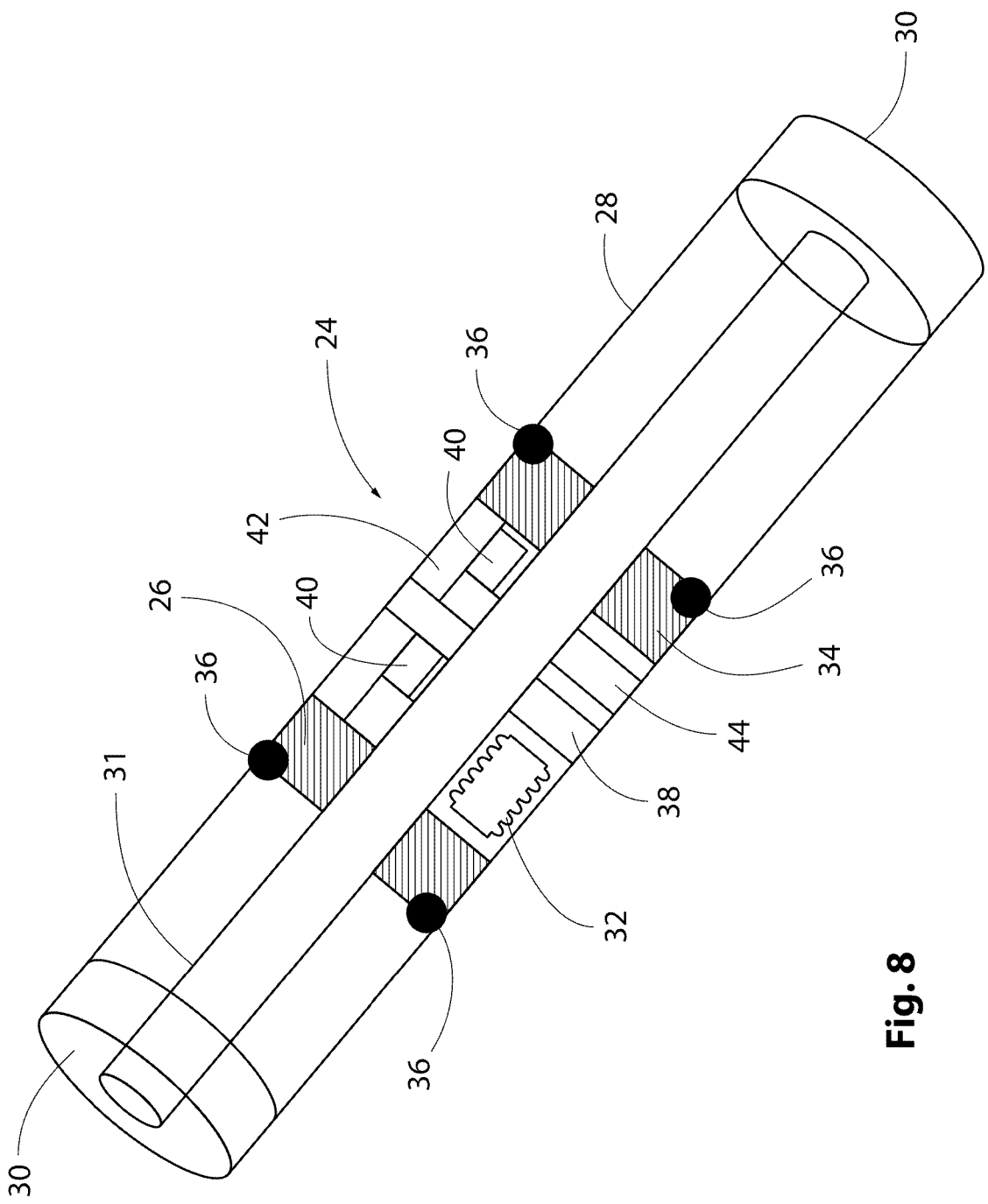
FIG. 8 illustrates a perspective view of an example of an internal shaft-mounted buoyancy aid.
Figure 9:
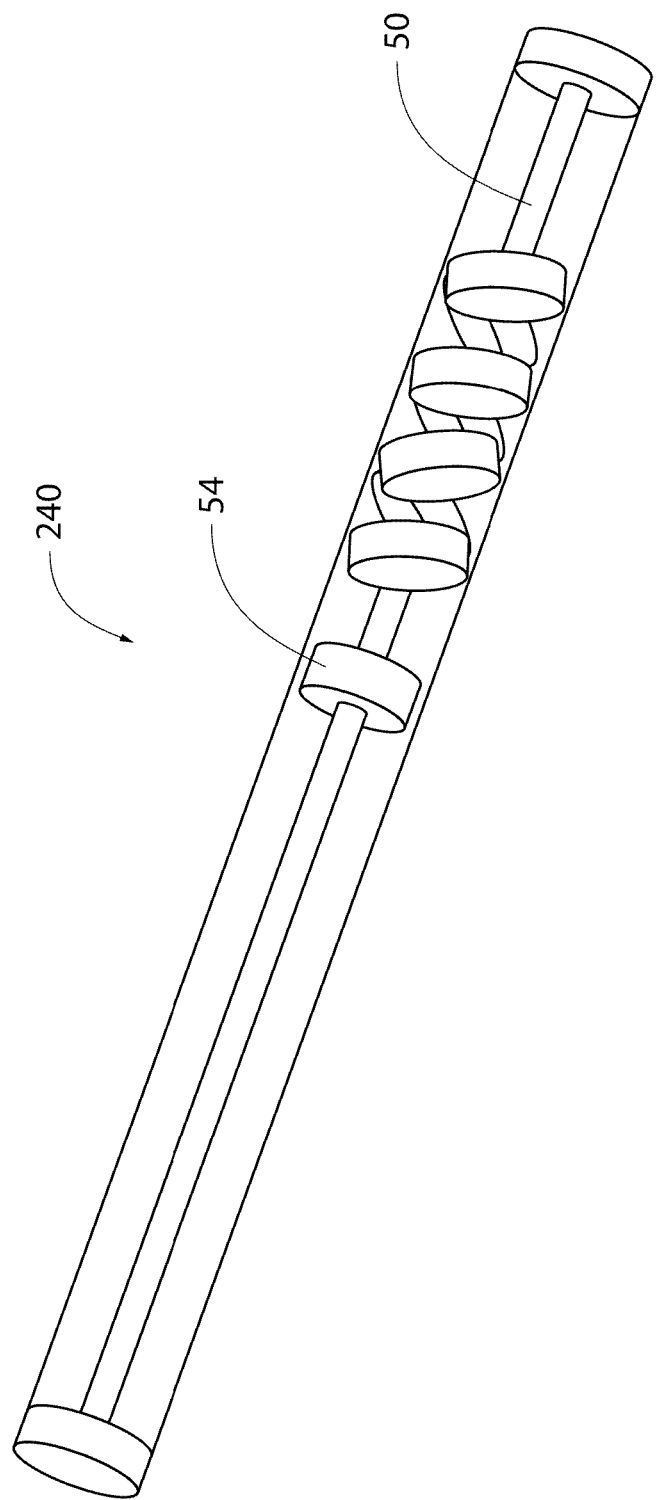
FIG. 9 illustrates a perspective view of an example of an internal shaft-mounted buoyancy aid.
Figure 14:
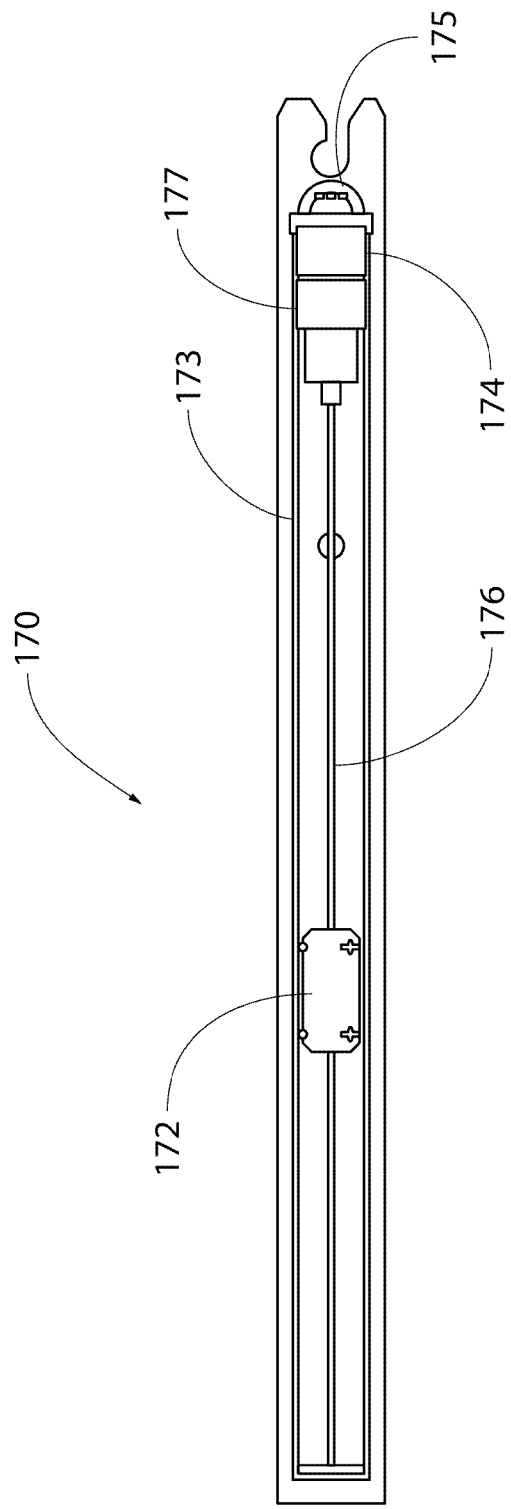
FIG. 14 illustrates a perspective view of an example of an internal shaft-mounted mounted buoyancy aid including an operational balancing mechanism.

Referring to FIGS. 8, 9 and 14, a further example of buoyancy adjustment may be provided by including a shaft-based buoyancy aid/balancing mechanism within the elongated shaft 13. The shaft-based buoyancy aid/balancing mechanism can be used as an alternative to the external buoyancy adjusting component 17 or in addition to the external buoyancy adjusting component 17.

The shaft-based/internal buoyancy aid 24 (see FIG. 8) is located within the elongated shaft 13 and is arranged to move a mass relative to the elongated shaft 13 to vary weight distribution of the system such that buoyancy of the turbine apparatus 10 is controlled i.e. the position of the rotor mechanism 14 relative to flow is controlled.

The shaft-based buoyancy aid 24, as illustrated in FIG. 8, includes a movable mass 26 located inside a sealed gas-filled buoyant tube 28 which is inserted inside the elongated shaft 13.

The gas-filled buoyant tube 28 is sealed at both ends by end caps 30, which serve to secure a toothed rack 31 that extends along the entire length of the tube 28. A worm gear 32 is included. Meshing of the teeth on the toothed rack 31 and the teeth of the worm gear 32 facilitates movement of the mass 26 along the length of the tube 28. A belt or piston actuator may alternatively be used to facilitate movement of the mass 26 along the length of the tube 28.

In the illustrated example, a wheeled housing 34 is included within the tube 28. The housing includes six wheels 36 arranged to align the housing 34 inside the tube 28 and to transport the housing 34 along the length of the tube 28 when buoyancy is to be adjusted.

The movable mass 26, the worm gear 32, a motor 38, guide blocks 40, batteries 42 and an electronic controller 44 are assembled as part of the wheeled housing 34. Each component plays a part in adjusting buoyancy of the turbine apparatus 10.

An alternative example (see FIG. 9) of a shaft-based buoyancy aid 240, includes a lead-screw or translation screw 50 and a movable mass 54 located within the elongated shaft 13. The mass 54 moves relative to the lead screw 50 such that buoyancy of the turbine apparatus 10 can be adjusted.

Each shaft-based buoyancy aid 24, 240 may include electronic control including a servo mechanism to control movement of the mass 26, 54 via a geared arrangement 31, 32 as illustrated in FIG. 8 or a leadscrew arrangement 50 as illustrated in FIG. 9 such that the position of the mass 26, 54 is tunable to maintain the pitch angle of the elongated shaft 13 and the rotor mechanism 14. By utilising an electronically controlled shaft-based buoyancy aid 24, 240, automatic corrections or tuning adjustment of the pitch angle of the turbine apparatus 10 can be implemented by an onboard microprocessor controlling the servo mechanism.

A benefit of automatic tuning is that the turbine apparatus 10 is automatically responsive to dropping or rising (pitching) of the turbine apparatus 10 and incremental movement of the mass 26, 54, to compensate for a rising or falling pitch, can be controlled.

Providing such automated control makes the turbine apparatus 10 responsive to potential changes in buoyancy over long deployments. Changes in water density or fouling can cause changes in buoyancy. For example, a turbine apparatus 10 utilising a responsive system can operate more reliably in a tidal estuary where water density varies from day to day depending on the mix of salt water and river water present.

The controller may incorporate sensors (not illustrated) including a shaft pitch angle sensor. The ability of the controller to actively measure the pitch angle of the elongated shaft 13 allows the controller to intelligently adjust the movable mass according to an internal algorithm. As noted above, controlling the pitch angle is useful, for example, to compensate for mass accrued due to fouling from the water way in which the turbine apparatus 10 is deployed, or in estuaries where water density can vary over time. The controller may also be configured to provide feedback regarding at least the pitch angle of the elongated shaft 13.

The controller may comprise remote communication functionality, achieved, for example, via a wire, tube, an external switch, or by a built-in underwater acoustic modem. It will be appreciated that such functionality permits the buoyancy of the elongated shaft to be altered, permits the shaft to be raised by remote control to assist boat crews in recovery and maintenance of the turbine apparatus 10

By providing remote control and feedback, the controller may be operable to raise an alarm to a maintenance vessel or to shore if one or more problems are detected, for example problematic pitch angle, rotational speed, or non-standard movement, one or more of which may indicate damage to at least part of the turbine apparatus. The controller can also log sensor readings, and broadcast accrued status by radio when raised at the surface.

As discussed above, the turbine apparatus 10 can be anchored via a mounting spike 18, mounting cylinder 18A or torque bar 300 (see FIGS. 3 and 10) to a support structure (not illustrated). The support structure being anchored or fixed to the bed, moorings, for example buoys and/or banks of the body of water, for example a river, sea or the like, in which the turbine apparatus 10 is deployed.

This arrangement has the effect that the rotor mechanism 14 is supported above the seabed/river bed and self-aligns with the water flow. The effect of the water flow over the rotor mechanism 14 is resolved into two main components, namely torque on the rotor mechanism 14 which is transmitted into the power take-off mechanism 16 via the elongated shaft 13, and turbine thrust along the longitudinal axis of the elongated shaft 13.

The power take-off mechanism incorporates, among other things, a thrust bearing to bear the considerable turbine thrust loads whilst allowing rotation of the turbine.

In the illustrated example, the mounting spike/rod 18, mounting cylinder 18A and torque bar 300 (described further below relative to cable/rope/chain mounting) provide a pivotal point about which the turbine apparatus 10 can rotate/yaw in response to the flow direction. This freedom of movement coupled with the freedom of movement provided by the flexible coupling 15 means that the turbine apparatus 10 is responsive to any change in flow direction and therefore is capable of very durable and effective energy capture and power generation in relation to its material mass and cost. The mounting spike/rod 18 and mounting cylinders 18A, 300 may incorporate a power export connector (not illustrated) which in power ready state will be operable to connect the power take-off mechanism 16 to an export umbilical which facilitates on-shore recovery of power.

Alternative support arrangements may be provided, for example by a floating structure, such as a platform, buoy, vessel etc., an anchored structure or tensioned cable/wire anchored to the edge of a body of water (for example the bank of a river, a rock wall in a tidal stream) or a structural mount extending down from a bridge etc.

Figure 12:
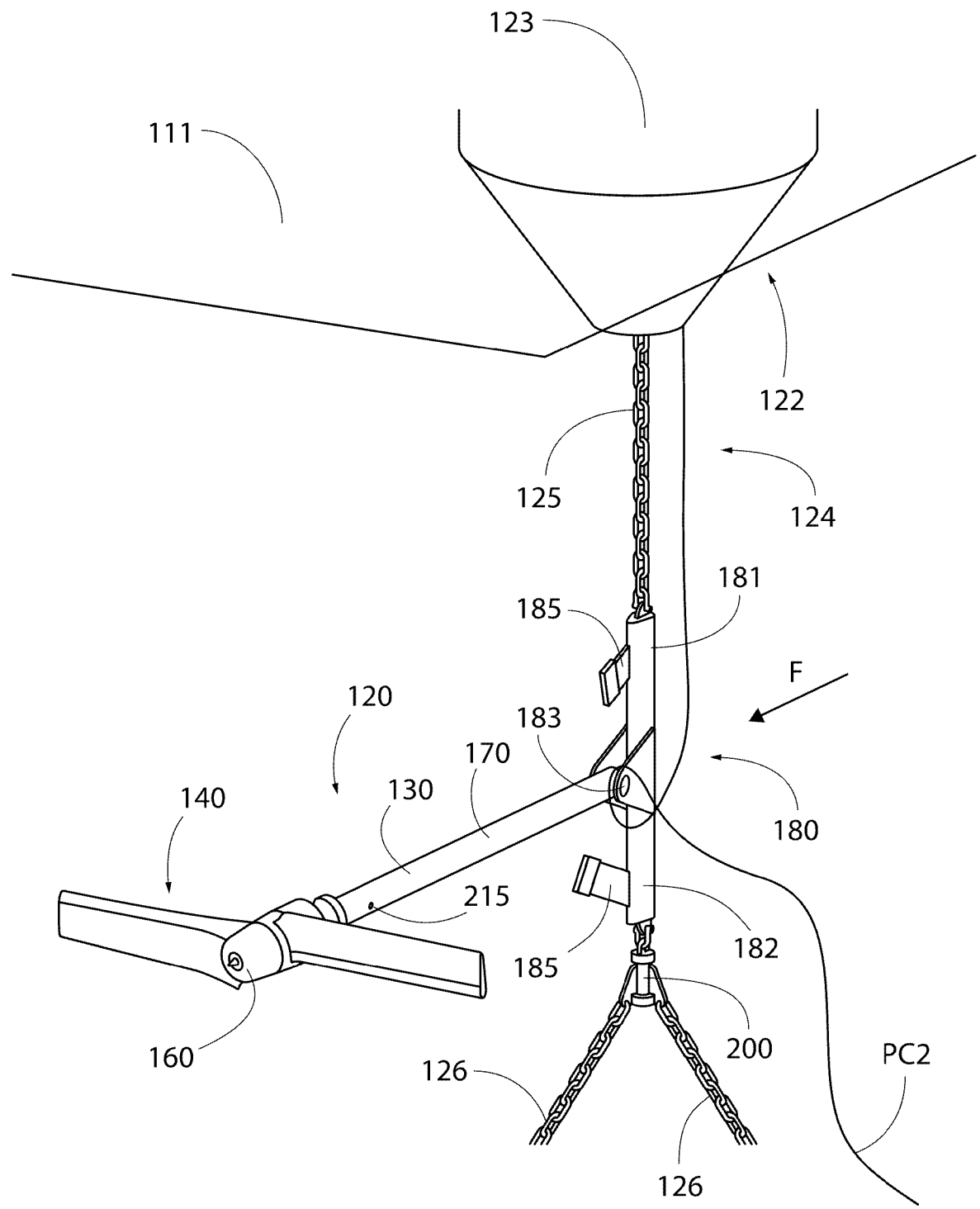
FIG. 12 illustrates a mooring/buoy mounted turbine apparatus according to an example of the present invention.
Figures 13A, 13B:
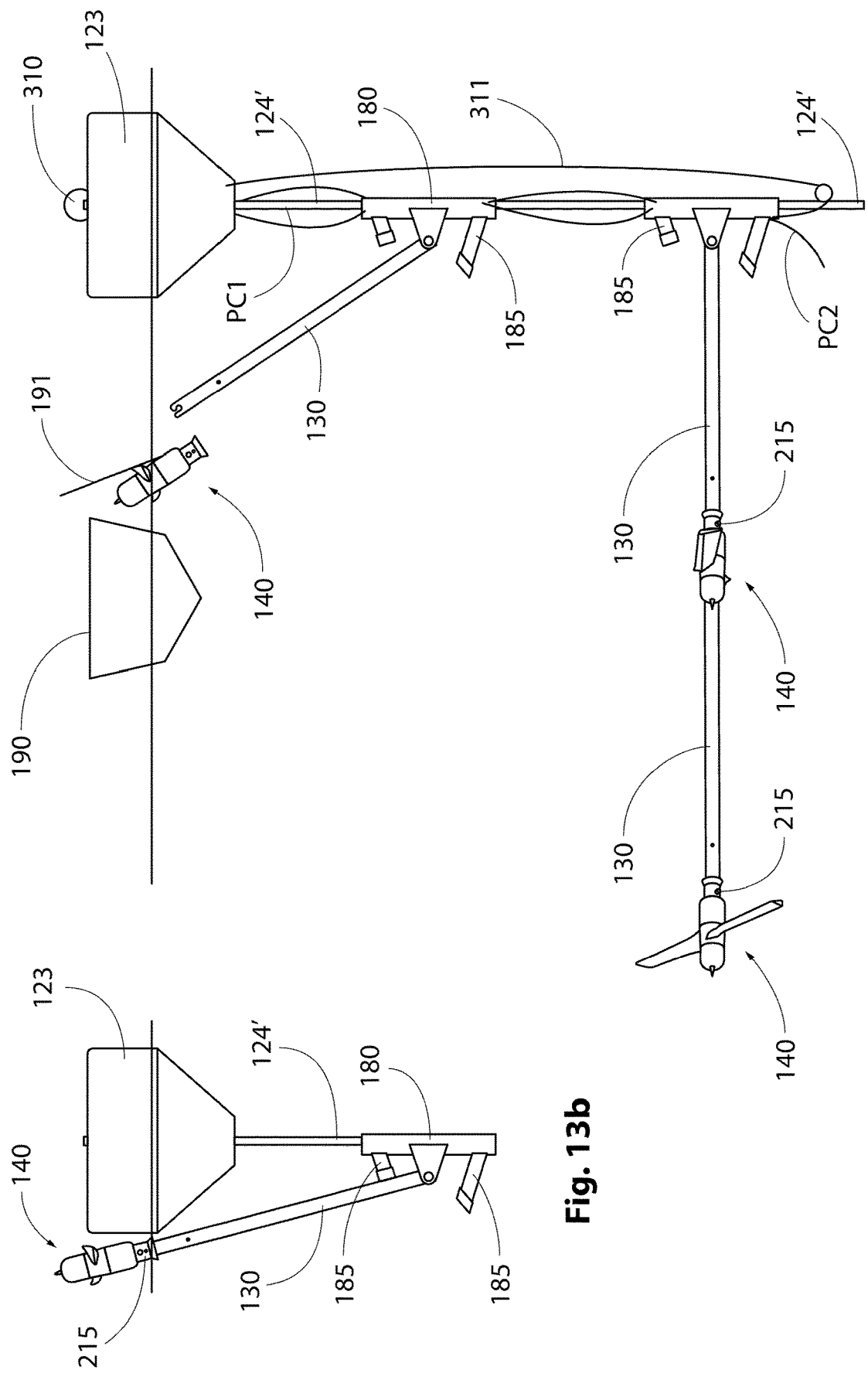
FIG. 13a illustrates in series turbine apparatus, in-parallel turbine apparatus and the effect of change in buoyancy of the turbine apparatus, thereby allowing removal of a rotor mechanism to a vessel at the surface of the water in which the turbine apparatus are deployed.
FIG. 13b illustrates maximum range of motion of the rotor mechanism when the system is positively buoyant, thereby illustrating the function of the bump-stop.

FIG. 10 illustrates one such example of a support arrangement for the turbine apparatus 10. In the illustrated example, the mounting spike 18/rod (see FIG. 1) and the cylinder mount 18A (see FIG. 3) is replaced with a torque bar 300, which is supported on a tensioned cable 310. As described above, the turbine apparatus 10 includes a rotor support system 12, a rotor mechanism 14 and a power take-off mechanism 16. In the illustrated example, the orientation of the torque bar 300 is horizontal, but it will be appreciated that a similar arrangement can be utilised to support the turbine apparatus on a vertical structure (see FIGS. 12, 13a and 13b), where the torque bar 300, or similar, is received on a substantially vertical rod or support, for example cable, rope, chain etc.). FIGS. 12, 13a and 13b illustrate a turbine apparatus 10 supported in this way on a vertical mooring line or chain extending from the seabed to a floating buoy. Multiple turbine apparatus 10 could be mounted on one such mooring line or chain in the manner illustrated (see FIG. 13a).

FIG. 10 shows two turbine apparatus 10 arranged in parallel and supported on a tensioned cable 310. However, it will be appreciated that one or more turbine apparatus 10 could be mounted on a single cable 310, for example a cable 310 spanning between two or more supporting structures (not illustrated). Alternatively, the tensioned cable 310 may extend from a supporting structure to the bank/shoreline of a river or body of water, between the bed and the bank/shoreline of a body of water or across a body of water, such as a river, where a supporting structure/member may be anchored to the bank/shoreline on each side of the body of water. In the example of installation/deployment described above it should be appreciated that the bank/shoreline can be substituted by any similarly robust natural structure or a man-made structure, for example a jetty or bridge pier.

In an arrangement where the cable 310 extends to the bank/shoreline or to a buoy the turbine apparatus 10 may be moved along the cable using a positioning line 311 as part of a deployment or retrieval method. To maximise the control of orientation of the rotor mechanism 14 in the water the connection of the turbine apparatus 10 to the tensioned cables 310 is such that the turbine apparatus 10 can pivot relative to the cable 310 to accommodate any change in flow direction.

FIG. 11 illustrates two rotor support systems 12 arranged in series, where each rotor support system 12 comprises an elongated shaft 13, a flexible coupling 15 and a rotor mechanism 14. In the illustrated example, the arrangement includes a single power take-off mechanism 16 adjacent to the supported end of the first elongated shaft 13. The energy captured, and the power transmitted from the arrangement illustrated in FIG. 11 is expected to be greater than a system including a single rotor mechanism 14. Two or more elongated shafts 13 and rotor mechanisms 14 may be mounted in this way. An alternative arrangement to that illustrated in FIG. 11 may include a single rotor support system 12 i.e. a single elongated shaft 13 carrying multiple rotor mechanisms 14.

In the examples described above, the transmission of torque from the rotor mechanism 14 into the power take-off mechanism 16 is facilitated by the elongated shaft 13 and the flexible coupling 15.

The power generating turbine apparatus 10, as described above and illustrated in FIGS. 1 to 11, enables the provision of a lightweight, low cost and readily deployable apparatus operable to generate power from free stream fluid flow.

In the system illustrated in FIGS. 10 and 11 the turbine apparatus 10 includes a rotor mechanism 14 which includes three rotor blades 15 and a ring 17 connecting the outer extremities of the rotor blades. The ring 17 enhances the hydrodynamic stability and yawing properties of the deployed turbine apparatus 10 and protects the tips of the rotor blades 15 during operation.

The rotor support system 12 described and illustrated in FIGS. 1 to 11 represents a system that can be utilised with simple low-cost support structures to provide a simplified and cost-effective operational system, which due to the responsive nature of the substantially neutrally buoyant rotor support system protects the supporting structure against spikes in load force which may be exerted on the structure for example due to waves or even objects interacting with the turbine apparatus 10. The loads exerted by the rotor support system 12 at its connection to the support structure are simplified due to its design, predominantly comprising stream-wise thrust and torque loads arising from rotation of the rotor mechanism.

The examples described above refer to deployment in a waterway, such as a river etc, but it will be appreciated that power can be produced from waterflow, for example water flowing through natural or man-made ducting/channels, culverts, funnels, including storm drains, and certain pipes. As such, it is reasonable to consider deployment of an apparatus as described herein in such an environment.

In the context of power generation, the example illustrated and described with reference to FIG. 3 may be considered a medium scale turbine apparatus 10 e.g. 15 kW capacity. The example illustrated and described with reference to FIG. 10 may be considered a small-scale turbine apparatus e.g. 5 kW capacity. The example illustrated and described below, with reference to FIGS. 12 to 15 may be considered a large-scale turbine apparatus e.g. 30 kW or greater capacity. FIG. 12 illustrates a turbine apparatus 100, which in the illustrated example is deployed in the sea/ocean. The turbine apparatus 100 includes a suitably adapted rotor support system 120, which, in the illustrated example is connected to a conventional mooring 122, which comprises a float/buoy 123 floating on the water surface 111 and a mooring chain 124, comprising a down-chain 125 and anchor chains 126. The mooring chain 124 facilitates locating the float/buoy 123 in a defined location.

Multiple anchor chains 123 are illustrated in FIG. 12, but it will be appreciated that a mooring comprising a single chain, rope, cable etc. may also be used, for example, see FIG. 13.

Where chains are illustrated in FIG. 12 or the term 'chain' is used these may also indicate instead steel cable, fibre or polymer lines, or a mix of these. Likewise, the term down-chain may also be interpreted as referring to a down-line.

The turbine apparatus 100, similar to the turbine apparatus 10 illustrated in FIGS. 1 to 11, includes the rotor support system 120, a rotor mechanism 160, a power take-off mechanism 140 and a mounting element 180 operable to connect the turbine apparatus 100, via the rotor support system 120, to a support structure, which in this example is provided by mooring chain 124.

In contrast to FIGS. 1 to 11, in the example illustrated in FIGS. 12 to 15, the turbine apparatus 100 includes the power take-off 160 as part of the rotor mechanism 140.

The rotor support system 120 includes an elongated shaft member 130 and a buoyancy adjusting component (balancing mechanism) 170; in the illustrated example the buoyancy adjusting member/balancing mechanism 170 is a shaft-based buoyancy aid, which is internal to the elongated shaft 130 as described further below.

In the example illustrated in FIGS. 12 and 13, the mounting element 180 includes a torque bar assembly 181, which includes a vertical channel or tube section 182, which in FIG. 12, replaces a section of the down-chain, or in FIG. 6b and FIG. 13 receives a section of the down-chain/down-line 125 within the channel or tube 182, and a horizontal protruding section 183, which terminates with a clevis-type joint 184. In the illustrated example, the free second end of the elongated shaft 130 is secured via the clevis-type joint 184 to the horizontal protruding section 183; the junction of the elongated shaft 130 and the horizontal protruding section 183 facilitates pitching movement of the turbine apparatus 100; yaw movement is prevented at this joint and yaw movement instead occurs through rotation of the apparatus about the long axis of the vertical channel or torque bar 181 and down-chain/down-line 125.

In the illustrated example, the axis of the pitching joint and the axis of yaw movement are intentionally offset radially from each other by a predetermined distance which is formed by the length of the horizontal protruding section 183. This acts to improve the effectiveness of the torque bar 181 at counteracting turbine operational torque in a wider range of conditions, reducing pitching of the torque bar 181 at high flow velocities.

In the example given the down-chain/down-line 125 and torque bar 181 are vertical, however they can also be horizontal (see FIG. 10) or at an alternative angle depending on deployment requirements. For example, the torque bar 181 may be mounted on a down-chain/down-line 125 which is provided by a steel cable running diagonally from the lower parts of a bridge pile to an upper or above-water part of an adjacent bridge pile (not illustrated).

FIG. 12 shows the torque bar 11 being removably fixed to the down-chain 125 by pins or clamps and FIG. 13 illustrates the torque bar 11 being integrated as part of the down-line. Both configurations illustrated in FIGS. 11 and 12 allow yawing through the chain/cable/rope/line twisting. In an alternative configuration (see FIG. 6b) the torque bar 181 is configured to receive the cable/rope/line inside the channel or tube 182 such that the torque bar can be moved along the down-chain/down-line 125 in either longitudinal direction to achieve the desired location of the turbine apparatus 10/100 facilitating free rotation of the torque bar 181 around the longitudinal axis of the down-chain/down-line 125 thereby allowing yaw of the turbine apparatus 10, 100 relative to the down-chin/down-line 125.

In the illustrated example, positioning the torque bar 181 relative to the down-chain/down-line 125 is by an actuator or a loop of lines connected to either end of the torque bar assembly 181 and looped over pulleys at either end of the down-chain/down-line 125. Temporary locking in position may be achieved by suitable latching of these lines and/or the torque bar relative to the down-chain/down-line 125.

By way of example, in the bridge pile assembly as described above (not illustrated) the mounting arrangement facilitates height adjustment of the turbine apparatus 10, 100 relative water levels and to capture optimum flows during operation. The arrangement also facilitates retrieval of the turbine apparatus 10, 100 to a position at or above water surface thereby allowing access to the turbine apparatus 10,100 for inspection or maintenance.

In the example illustrated in FIGS. 12, 13a and 13b two bump-stops 185 extend from the elongated element of the torque bar 181. One bump-stop 185 is located above the clevis-type joint 183 and one bump-stop 185 is located below the clevis-type joint 183. The bump-stops 185 are positioned such that the pivotal extent of the pitching movement of the turbine apparatus 10, 100 is restricted within predetermined limits.

The bump-stops 185 may include a degree of resilience or damping such that they are responsive to changing conditions and therefore any risk of damage to the turbine apparatus 100, if colliding with the bump-stop is minimised. The bump-stops 185 may include springs or elastic dampers. In normal use, pitching movement of the turbine apparatus 100 relative to the direction of fluid flow should be negligible due to the neutral buoyancy status of the turbine assembly 100 plus its elongated design being such that it naturally aligns with the direction of fluid flow.

In the illustrated example, see FIG. 12, the mounting element 180 utilises an arrangement of plates and pins which connect to links of the mooring chain 124 to secure the turbine apparatus 100 to the mooring chain 124. It will be appreciated, that alternative fasteners may be adopted, for example one or more clamps or a combination of different fasteners.

The mounting element 180 forms a physical link/connection between two or more sections of chain, and is physically connected to these chain sections by, for example a yaw rotary joint 200 such that rotation/pivot of the mounting element 180, hence the turbine apparatus 10,100 relative to the chain is limited to a predetermined angular range, for example 150 degrees. In the example illustrated in FIG. 12, i.e. utilising multiple anchor chains 126, a yaw plate 200 is provided at the junction of the down-chain 125 and the anchor chains 126. As illustrated in FIG. 12, the turbine apparatus 100 yaws freely about the long axis of the torque bar assembly 181 and down-chain 125, and the extent of yawing is limited in relation to the yaw plate 200.

The two opposing anchor chain lengths 126 in the mooring configuration shown in FIG. 12 apply opposing tension forces at the yaw plate 200 via connection points on the plate which are separated by a specified distance to create a force which tends to bias alignment of the plane of the yaw plate 200 to align with the path of the anchor chains 126. Physically limiting the yaw extents of a turbine apparatus 100 in relation to the alignment of this yaw plate 200 can be used to bias or limit yaw of a turbine apparatus to only occur around one side of the down-chain 125 during the zero flow periods within directionally changing tidal flows. This is achieved by connecting a yawing part of the turbine's support to the yaw plate directly or via a short length of down-chain 125 or via a rotational coupling capable of limited rotation. The same effect as a yaw plate can also be produced by any arrangement which symmetrically connects the two opposing anchor chain lengths 126 and the one down chain 125 such that these connection points are spaced apart.

An anti-rotation post (not illustrated) may extend downward of the yaw plate 200. The anti-rotation post is operable to help prevent yaw plate rotation and hence uncontrollable rotation of the turbine apparatus 100 about the long axis of the down-chain 125. It does this by ensuring the biasing restoring yaw moment acting on the yaw plate 200 remains effective even if greater than 180 degrees of yaw movement from the neutral point should occur on the yaw plate.

The yaw plate 200 and the anti-rotation post (when used) promote a yaw returning force as a result of tension in the mooring chains 124 and 126. This ensures the turbine apparatus always yaws back towards a neutral starting position when the current slows to a stop.

In the example illustrated in FIG. 13a i.e. using a single anchor chain/chain leg 124', or when the mounting element 180 is affixed such that it has substantially unhindered freedom to yaw round the axis of a chain leg 124', yaw is controlled via holes 215 provided at the root of the rotor mechanism 140 i.e. the position where the rotor 140 attaches to the elongated shaft 130.

A bi-directional lateral thruster 215 is provided at this location and water or gas is expelled as a jet from the holes at stationary tide flow to control yawing movement of the turbine apparatus 100.

The holes are positioned on each side of the horizontal diameter of the body 141 of the rotor mechanism 140. The thruster or jet 215 is computer controlled based on measured direction of the turbine apparatus 100 and flow velocity.

FIG. 12 illustrates an example of power umbilical PC1 and PC2 and the position of the rotor mechanism 140 relative to flow direction, as indicated by arrow F.

In the example illustrated in FIGS. 12 to 15, as with the examples illustrated in FIGS. 1 to 11 efficient transmission and generation of power is optimised due to the responsiveness of the turbine apparatus 100 to changing flow directions. This responsiveness of the turbine apparatus 100 is provided by the combination of a substantially neutrally buoyant system, active balancing, and yaw control where the turbine apparatus 10, 100 has a compliant attitude relative to the support structure and the plane of flow.

The neutrally buoyant system comprises an assembly of the rotor mechanism 140 and the rotor support system 120. Neutrally buoyant, as described above, means the average density of the turbine apparatus 100 is substantially equal to the density of the water in which the turbine apparatus 100 is immersed. Within a reasonable tolerance, when mounted as illustrated to the mooring chain 123, the freely articulating turbine apparatus 100 is configured such that there is no tendency to move upward or downward due to buoyancy or gravitational forces when left undisturbed.

In the examples illustrated in FIGS. 12 and 13a and 13b, neutral buoyancy and pitch angle of the turbine apparatus 100 is established by adjusting buoyancy via the elongated shaft 130 and the balancing mechanism 170, which is provided inside the elongate shaft 130.

The balancing mechanism 170 is arranged to move a mass (see FIG. 14) relative to the elongated shaft 130 i.e. to vary weight distribution within the elongated shaft 130 such that buoyancy distribution and centre of mass of the turbine apparatus 100 is controlled.

Operating the balancing mechanism is similar to the shaft-based buoyancy aid 24, as illustrated in FIG. 8 and FIG. 9 i.e. the balancing mechanism 170 includes a movable mass 172 located inside an air-filled sealed buoyant tube 173, which is inserted into the elongated shaft 130.

In the examples illustrated in FIGS. 12, 13a and 13b, it will be appreciated that a flexible power and communications umbilical PC1, PC2 run from the power take off and will most likely follow the mooring chain either upwards to the buoy and/or downwards to the seabed depending on where onward power and control equipment is located. In certain circumstances, a downward umbilical may pass through a rotary yaw joint (see FIG. 12) to avoid it twisting with yaw movement. Yaw control can be used to avoid this requirement.

Yaw control is particularly important when there is a downward umbilical because full yaw rotation in, for example, changing tidal flow directions, may damage the umbilical.

In the example illustrated in FIG. 14, the movable mass 172, an electronic controller 174 and a lead screw or translation screw 176 are assembled as part of the balancing mechanism 170. In contrast to the example illustrated in FIG. 8, in the apparatus illustrated in FIG. 14, only the mass 172 moves and all controls are located to one end of the tube containing the mass 172 and the lead screw 176. The mass 172 is placed relative to rotation of the lead screw or other drive 176. Movement of the mass 172, relative to the lead screw 176, adjusts buoyancy distribution of the turbine apparatus 100 and so is used to regulate its pitch angle. Other drive mechanisms may be employed, for example ratchet drive, piston, belt drive etc.

The tube 173 can be pulled out of the elongated shaft 130 for servicing when the rotor mechanism 140 is removed, and while the tube 173 is pitched upward with its end at the water surface level this is easily achieved from a boat or vessel 190. A handle 175 facilitates removal of the tube 173.

Electronic control allows remote activation and may facilitate automatic corrections or tuning adjustment of the pitch angle of the turbine apparatus 100 via an onboard microprocessor. The microprocessor incorporates a gravity sensor or gyroscope 177. Using a software algorithm, the sensor continually determines tilt or attitude of the elongated shaft 130 and if this moves outside of targeted limits then it achieves a correction by causing movement of the mass along the tube 173 by a calculated amount and direction. It may also receive communication from external operators via a wire, acoustic signal or tube. When instructed by this means to bring the rotor assembly to the surface the algorithm will target a tilt angle which places the rotor assembly at the surface. A benefit of automatic tuning is that the turbine apparatus 100 is responsive to dropping or rising (pitching) of the turbine apparatus 100 and incremental movement of the mass compensates for a rising or falling pitch.

As noted above in respect of FIGS. 1 to 11, automated control provides a responsive turbine apparatus 100, wherein potential changes in buoyancy over long deployments are corrected.

The controller may incorporate sensors (not illustrated) including a shaft pitch angle sensor. The ability of the controller to actively measure the pitch angle of the elongated shaft 130 allows the controller to intelligently adjust the position of the mass 172 according to an internal algorithm. As noted above, controlling the pitch angle is useful, for example, to compensate for mass accrued due to fouling from the water way in which the turbine apparatus 100 is deployed, or in estuaries where water density can vary over time. The controller may also be configured to provide feedback regarding at least the pitch angle of the elongated shaft 130.

In the illustrated example, the turbine apparatus 100 includes a debris sensor 300, which is operable to detect an object or objects coming towards the rotor end of the turbine apparatus 100. This, in combination with an accelerometer or camera on the shaft may be used to foresee and then record data from, or to avoid, a potential collision event. Also, the data may be used to raise an alarm following a suspected event in order that potential rotor damage might be assessed. The controller may comprise remote communication functionality, achieved, for example, via a wire, an external switch, or by a built-in underwater acoustic modem. In the illustrated example, a wire runs from the microprocessor in the buoyancy aid onto the top of the buoy where a radio modem is operable to receive commands and transmit data remotely, for example to a vessel or on-shore facility. A switch is also connected on the buoy as part of this so that servicing boat personnel can use this to trigger the turbine to rise to the surface.

The electronics within the sealed unit may include the facility to convert electrical power from waste heat issued from the power take-off, in order to keep batteries topped up.

It will be appreciated that such functionality permits buoyancy of the elongated shaft 130 to be altered, for example buoyancy adjustment permits the turbine assembly 100 to be pivoted or raised (if detached from the mooring) by remote control to assist boat crews in recovery and maintenance of the turbine apparatus 100.

By providing remote control and feedback, the controller may be operable to raise an alarm to a maintenance vessel or to an on-shore facility if one or more problems are detected, for example problematic pitch angle, rotational speed, or non-standard movement, one or more of which may indicate damage to at least part of the turbine apparatus 100.

Figure 15:
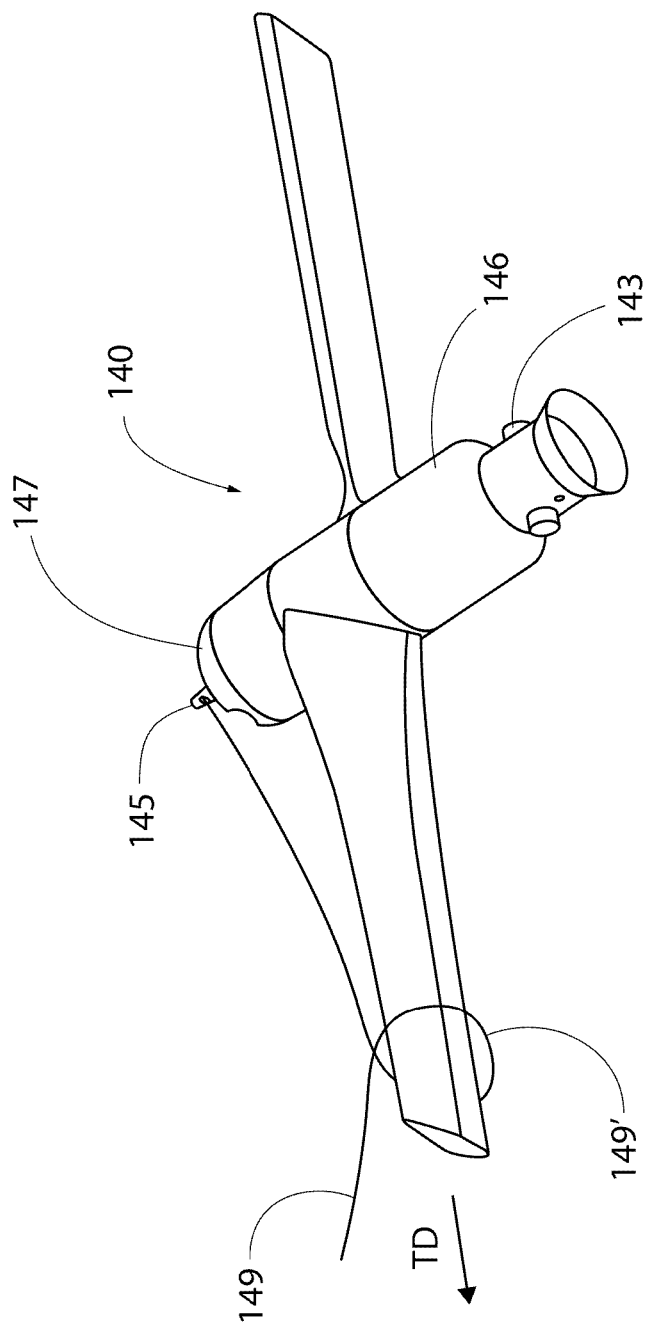
FIG. 15 illustrates an example of the rotor mechanism as illustrated in FIGS. 12 and 13 removed from the rotor support system.

FIGS. 13a, 13b, 14 and 15 represent versatility of the turbine apparatus 100 for the purpose of maintenance and/or repair, wherein FIGS. 13a and 13b show the turbine assembly 100 pivoted about the mounted end of the elongated shaft 130 such that the rotor mechanism 140 is shifted/floated towards the surface of the water 141. FIG. 13a and FIG. 15 show the rotor mechanism 140 detached from the elongated shaft 130.

FIG. 13a includes a representation of a vessel 190, for example a boat, which is positioned near the mooring 122 to facilitate maintenance, repair or recovery of the rotor mechanism 140. The turbine apparatus 100 is adapted to the position illustrated in FIG. 13 by adjusting buoyancy of the turbine apparatus 100 via the internal balancing mechanism 170. In this position, it is evident the rotor mechanism 140 is elevated towards the surface of the water and is accessible from the vessel 190.

FIG. 13a also illustrates the rotor assembly removed from the elongated shaft 130 and includes a removal tool 191, which facilitates removal of the rotor mechanism 140 from the elongated shaft 130 and retrieval of the rotor assembly 140 from the vessel 190.

FIG. 13a illustrates versatility of the turbine apparatus 100, where the lower section of FIG. 13a illustrates an in-series arrangement of two turbine apparatus 100 and an upper section includes a single turbine apparatus 100 extending from a single mooring line 124' extending down from a buoy 123.

FIG. 13a illustrates an example of how the position of the turbine apparatus 100 relative to the tether/mooring line 124' can be adjusted utilising a rope and pulley system 311 and a winder and lock 310 to ensure the turbine apparatus is deployed at the appropriate depth. Power umbilicals PC1, PC2 carries power and/or hydraulic fluid and control signals to the seabed, buoy or both.

FIG. 13b, illustrates the turbine apparatus 100 in a parked status. In certain circumstances it may be desirable not to use the turbine apparatus 100, but it may be necessary to keep the rotor mechanism on the elongated shaft and in the deployed location. To protect the apparatus and to prevent unnecessary operation, the example in FIG. 13b illustrates the extent of tilt of the elongate shaft 130 to a maximum floated extent, where the rotor mechanism 140 is proximate the mooring buoy. In this position the rotor mechanism may be tethered to the buoy 123 via a central towing eye 145 to hold it securely in this position. It will be appreciated, by lifting the rotor mechanism clear of the water operation or loading of the rotor mechanism 140 is prevented. The parked position also facilitates a detailed inspection.

FIG. 15 represents the rotor mechanism 140 detached from the elongated shaft 130. In the example illustrated, a latch mechanism 143 facilitates attaching/locking the rotor mechanism 140 to the elongated shaft 130 and detaching/releasing the rotor mechanism 140 from the elongated shaft 130. Power, control and communications connectors at this interface are also simultaneously released.

To ease retrieval of the rotor mechanism 140 an unlocking spike 146 is provided for engagement with a suitable unlocking tool 191 (as illustrated in FIG. 13a). A towing eye 145 and a buoyant nose 147 are provided on the free end of the rotor mechanism 140 to aid towing when the rotor mechanism 140 is released from the elongated shaft 130. Retrieval of the rotor mechanism 140 is compatible with a small vessel/boat due to the towing eye 145 and the buoyant nose 147.

The towing eye 145 doubles as an attachment point for a towing line 149 during the detachment process i.e. to allow a boat operative to come alongside and stabilise the turbine assembly 100 during the detachment process. In an example, the towing line may have a loop fitted, which is one turbine-blade-length from the free end of the towing line 149. This loop 149' is tightened around the end of a turbine blade and the free end of the towing line 149 is secured at the towing eye 145 (see FIG. 15). This ensures the rotor mechanism 14, 140 can be secured at its blade end for efficient and safe towing in a blade-lengthwise direction (see arrow TD).

It will be appreciated removing the rotor mechanism 140 from the elongated shaft 130 permits access to inside the elongated shaft 130. This means the balancing mechanism/buoyancy adjusting component 170 (see FIG. 14) is accessible, maintainable and possibly removable for repair or replacement (as described above in respect of FIG. 14).

The illustrated example, may be connected to shore via an umbilical, or to equipment in the mooring buoy/float 123, with a further umbilical then onwards from there to the shore. If a power umbilical to shore is not practical then power can be stored or usefully utilised by equipment located within the buoy 123. This may include energy storage in battery, gas or liquid form, or useful work such as atmospheric carbon dioxide removal, ocean cleansing, communications, lighting etc.

Modifications and improvements may be made to the foregoing embodiments within the scope of the claims defining the invention.

Whilst specific examples of the present invention have been described above, it will be appreciated that departures from the described examples may still fall within the scope of the claims defining the invention.

The invention claimed is:

1. An axial flow turbine apparatus for deployment in a waterway, the turbine apparatus comprising:
   a rotor support system;
   a rotor mechanism; and
   a power take-off device;
   wherein the rotor support system is operable to support and control position and alignment of the rotor mechanism relative to a direction of flow of flowing water in the waterway, wherein deployment of the turbine apparatus in flowing water generates power;
   wherein the rotor support system includes:
   an elongated shaft having an internal surface;
   a buoyancy adjusting component;
   a flexible coupling at a first end of the elongated shaft; and
   the rotor mechanism being attachable to a second free end of the elongated shaft;
   wherein the flexible coupling:
   facilitates connection of the first end of the elongated shaft to a support structure located in the waterway in which the turbine apparatus is deployed, and facilitates a substantially freely yawing connection of the axial flow turbine apparatus to the support structure located in the waterway in which the turbine apparatus is deployed;
   controls pitching and yawing motion of the elongated shaft and the rotor mechanism relative to the support structure; and
   in use, responds to changes in flow of the flowing water, to maintain the turbine apparatus with a compliant attitude, thereby maintaining alignment of the axis of the elongated shaft and the rotor mechanism with the direction of flow; and
   wherein the buoyancy adjusting component is operable to maintain the deployed turbine apparatus with substantially neutral buoyancy relative to the waterway in which the turbine apparatus is deployed,
   wherein the buoyancy adjusting component comprises a movable mass that is movable relative to the elongated shaft to adjust buoyancy distribution of the assembly of the elongated shaft and the rotor mechanism such that the position of the rotor mechanism relative to the body of water is neutrally buoyant or buoyantly stable,
   wherein the buoyancy adjusting component is a shaft-based buoyancy aid that is located within the elongated shaft, the movable mass being connected to the internal surface of the elongated shaft, the movable mass being located inside a sealed gas-filled buoyant tube, wherein the gas-filled buoyant tube is sealed at both ends.

2. The axial flow turbine apparatus as claimed in claim 1, wherein the flexible coupling comprises a pivotal pitch connector and a pivotal yaw connector, wherein the pivotal pitch connector permits pitching motion of the assembly of the elongated shaft and the rotor mechanism relative to the support structure and the waterway in which the turbine apparatus is deployed.

3. The axial flow turbine apparatus as claimed in claim 2, wherein the pivotal yaw connector facilitates connection of the axial flow turbine apparatus to a support structure in a waterway and controls the degree of yawing motion of the axial flow turbine apparatus when deployed.

4. The axial flow turbine apparatus as claimed in claim 1, further comprising extremity bump-stops, which control the extent of pitching motion.

5. The axial flow turbine apparatus as claimed in claim 1, wherein the pivotal pitch connector comprises a universal joint connecting the elongated shaft to the pivotal yaw connector.

6. The axial flow turbine apparatus as claimed in claim 1, wherein the pivotal pitch connector comprises a connector facilitating single degree of freedom movement of the assembly of the elongated shaft and the rotor mechanism.

7. The axial flow turbine apparatus as claimed in claim 6, wherein the pivotal pitch connector comprises a clevis joint.

8. The axial flow turbine apparatus as claimed in claim 1, wherein the flexible coupling further comprises a resilient member operable in a biasing manner to maintain the assembly of the elongated shaft and the rotor mechanism in a compliant attitude relative to the support structure, toward a central or straight position, by permitting responsive movement of the assembly of the elongated shaft and the rotor mechanism and to limit the extent of pitching motion of the assembly of the elongated shaft and the rotor mechanism.

9. The axial flow turbine apparatus as claimed in claim 8, wherein the resilient member is a spring associated with the pivotal pitch connector.

10. The axial flow turbine apparatus as claimed in claim 1, wherein the pivotal yaw connector comprises a mounting spike receivable in a hollow support structure.

11. The axial flow turbine apparatus as claimed in claim 1, wherein the pivotal yaw connector comprises a hollow member or channel into which can be received a tether such as chain, rope or cable providing a support structure.

12. The axial flow turbine apparatus as claimed in claim 11, wherein the pivotal yaw connector is provided by a torque bar axially aligned to and mounted to a support structure comprising a tensioned tether member, wherein the torque bar is connected to the tether member and facilitates yawing motion and controls the extent of yawing motion of the turbine apparatus relative to the tether member.

13. An axial flow turbine apparatus as claimed in claim 12, wherein the torque bar comprises a T-shape arrangement, wherein the pivotal yaw connector is formed by the head of the T and the pivotal pitch connector is provided by the body of the T.

14. An axial flow turbine apparatus as claim 1, wherein the elongated shaft has an external surface the movable mass being connected to both the internal and external surfaces of the elongated shaft.

15. The axial flow turbine apparatus as claimed in claim 14, wherein the buoyancy adjusting component comprises an external mass provided by a sleeve comprising a hollow tubular member, wherein the elongated shaft is receivable within the hollow of the hollow tubular member and wherein the sleeve can slide along the external surface of the elongated shaft to adjust buoyancy of the turbine apparatus.

16. The axial flow turbine apparatus as claimed in claim 15, wherein the sleeve includes an inner tube within an outer tube, wherein the elongated shaft is received inside the inner tube and an annular space is defined between the inner tube and the outer tube and wherein the annular space is filled with buoyant material.

17. The axial flow turbine apparatus as claimed in claim 1, wherein the shaft-based buoyancy aid includes a wheeled housing operable to transport the movable mass along the length of the tube when buoyancy is to be adjusted.

18. The axial flow turbine apparatus as claimed in claim 1, further comprising an electronic controller operable to actively balance the assembly of the elongated shaft and the rotor mechanism relative to water flow, wherein the electronic controller is operable to measure pitch angle of one or more of the elongated shaft and the rotor mechanism and to effect and control movement of the movable mass such that the elongated shaft and the rotor mechanism are aligned with a predetermined, programmed, position.

19. The axial flow turbine apparatus as claimed in claim 1, comprising a translation screw located within the elongated shaft, wherein the movable mass is operable to move relative to the translation screw to adjust buoyancy of the assembly of the elongated shaft and the rotor mechanism.

20. The axial flow turbine apparatus as claimed in claim 1, further comprising a controller, operable to control the position of the buoyancy adjusting component along the elongated shaft.

21. The axial flow turbine apparatus as claimed in claim 1, wherein the rotor mechanism is removable from the end of the elongated shaft to allow the rotor mechanism to be transported to a suitable location for maintenance or replacement.

22. The axial flow turbine apparatus as claimed claim 1, comprising a series of assemblies of the rotor support system, the rotor mechanism and at least one power take-off device, wherein the elongated shafts of each assembly are arranged end to end, wherein a rotor mechanism is located between elongated shafts and at the second end of the last elongated shaft in the series.

23. The axial flow turbine apparatus as claimed in claim 1, comprising a series of assemblies of the rotor support system, the rotor mechanism and the power take-off device arranged in a side by side arrangement, wherein the elongated shafts of each assembly are arranged in-parallel.

24. The axial flow turbine apparatus as claimed in claim 1, wherein the power take-off device is connected proximate the first end of the elongated shaft.

25. The axial flow turbine apparatus as claimed in claim 1, wherein the power take-off device is connected proximate the second end of the elongated shaft.

26. The axial flow turbine apparatus as claimed in claim 1, wherein the power take-off is formed as part of a hub of the rotor mechanism.

27. The axial flow turbine apparatus as claimed in claim 1, wherein the rotor mechanism comprises a plurality of radially projecting rotor arms and a ring encircling ends of the rotor arms, wherein the ring is operable to enhance hydrodynamic stability of the turbine apparatus when deployed in flowing water.

* * * * *